US012732976B2

(12) United States Patent
Damnjanovic et al.

(10) Patent No.: US 12,732,976 B2
(45) Date of Patent: Sep. 8, 2026

(54) SYSTEM INFORMATION DESIGN IN SHARED OPEN RADIO ACCESS NETWORK RADIO UNIT SYSTEMS

(71) Applicant: QUALCOMM Incorporated, San Diego, CA (US)

(72) Inventors: Aleksandar Damnjanovic, Del Mar, CA (US); Abhishek Saurabh Sachidanand Sinha, San Diego, CA (US); Douglas Knisely, Redmond, WA (US)

(73) Assignee: QUALCOMM Incorporated, San Diego, CA (US)

( * ) Notice: Subject to any disclaimer, the term of this patent is extended or adjusted under 35 U.S.C. 154(b) by 521 days.

(21) Appl. No.: 18/318,788

(22) Filed: May 17, 2023

(65) Prior Publication Data

US 2024/0389083 A1 Nov. 21, 2024

(51) Int. Cl.
*H04W 72/0453* (2023.01)

(52) U.S. Cl.
CPC ............................... *H04W 72/0453* (2013.01)

(58) Field of Classification Search
CPC .. H04W 48/12; H04W 72/0453; H04W 88/10
See application file for complete search history.

(56) References Cited

U.S. PATENT DOCUMENTS

2018/0027554 A1* 1/2018 Yerramalli ............ H04L 5/0055 370/329
2019/0246335 A1* 8/2019 Mukherjee ............ H04W 48/08

(Continued)

FOREIGN PATENT DOCUMENTS

GB 2496946 A 5/2013
WO WO-2021142692 A1 7/2021

OTHER PUBLICATIONS

Ericsson: "System Information Content at Network Sharing", R2-1706500 (Resubmission of R2-1704390), 3GPP TSG RAN WG2 NR AdHoc#2, 3rd Generation Partnership Project, Mobile Competence Centre, 650, Route Des Lucioles, F-06921 Sophia-antipolis Cedex vol. RAN WG2, No. Qingdao, Jun. 27, 2017-Jun. 29, 2017 Jun. 26, 2017, XP051301005, 3 Pages, Section "2.1 NR Minimum SI at Network Sharing" Section "2.2 System Information Content per PLMN".

(Continued)

*Primary Examiner* — Benjamin H Elliott, IV
(74) *Attorney, Agent, or Firm* — Holland & Hart LLP

(57) ABSTRACT

Methods, systems, and devices for wireless communications are described. Some wireless communications systems may support system information design for systems that support spectral sharing and network entity sharing for multiple mobile network operators (MNOs). For example, a UE may monitor a radio frequency (RF) spectrum for synchronization signal blocks (SSBs) from a network entity and associated with an MNO. The RF spectrum and the network entity may be shared by the MNO and one or more other MNOs. The UE may receive the SSBs via a broadcast channel within the RF spectrum. The SSBs may be shared SSBs that may include dedicated system information associated with the MNO and shared system information associated with multiple MNOs. The UE may communicate via the RF spectrum according to the dedicated system information and the shared system information.

25 Claims, 18 Drawing Sheets

(56) References Cited

U.S. PATENT DOCUMENTS

| | | | | |
|---|---|---|---|---|
| 2021/0029549 | A1* | 1/2021 | Notargiacomo | H04W 24/02 |
| 2021/0266870 | A1* | 8/2021 | Bhandari | H04W 72/04 |
| 2021/0314853 | A1* | 10/2021 | Bai | H04W 48/12 |
| 2021/0385686 | A1* | 12/2021 | Ahmed | H04W 28/06 |
| 2022/0400412 | A1* | 12/2022 | Grayson | H04W 28/16 |
| 2023/0119045 | A1* | 4/2023 | Abdelmalek | H04W 48/18<br>370/328 |
| 2023/0164711 | A1* | 5/2023 | Ma | H04B 7/0695<br>370/503 |
| 2023/0254702 | A1* | 8/2023 | Damnjanovic | H04W 28/0967<br>455/501 |
| 2023/0379721 | A1* | 11/2023 | Gupta | H04W 88/085 |
| 2024/0040463 | A1* | 2/2024 | Haustein | H04W 36/30 |
| 2024/0106582 | A1* | 3/2024 | Sun | H04W 16/14 |
| 2024/0129839 | A1* | 4/2024 | Mildh | H04W 16/18 |
| 2024/0137774 | A1* | 4/2024 | Rossetti | H04W 16/14 |
| 2024/0267752 | A1* | 8/2024 | Shete | H04W 24/02 |
| 2024/0276406 | A1* | 8/2024 | Babaei | H04L 5/0053 |
| 2024/0389083 | A1* | 11/2024 | Damnjanovic | H04W 72/0453 |
| 2024/0422566 | A1* | 12/2024 | Tsuda | H04W 16/16 |
| 2025/0097909 | A1* | 3/2025 | Kumagai | H04W 72/0453 |

OTHER PUBLICATIONS

International Search Report and Written Opinion—PCT/US2024/022778—ISA/EPO—Jul. 10, 2024.

* cited by examiner

400

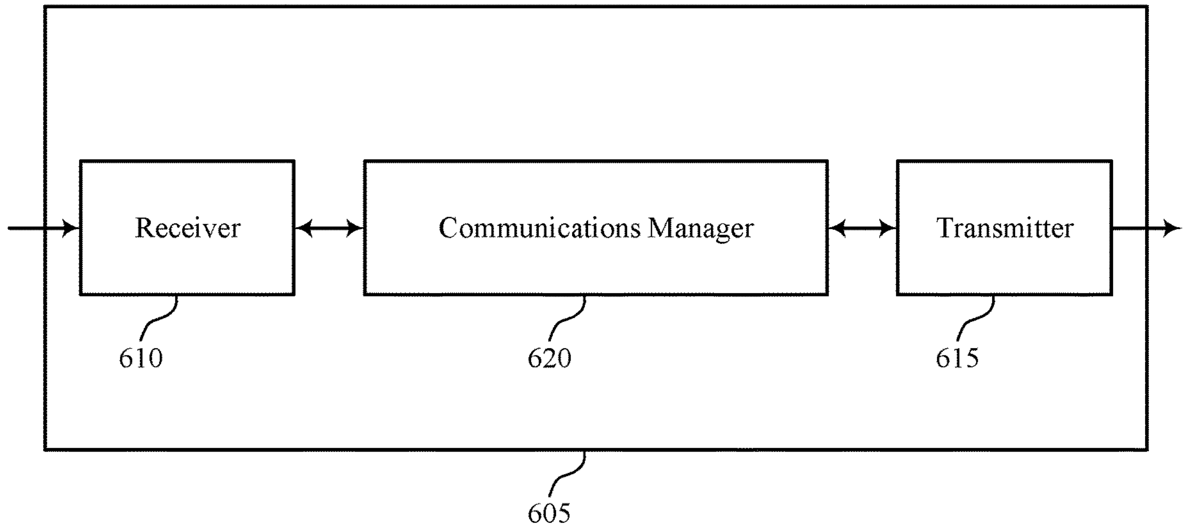
FIG. 6

700

1000

130
105
Network Entity
115

Transceiver
Antenna
1310
1315

Communications Manager
Memory
Code
1330
1325
1320

1340
Processor
1335

1305

1300

Figure 16:
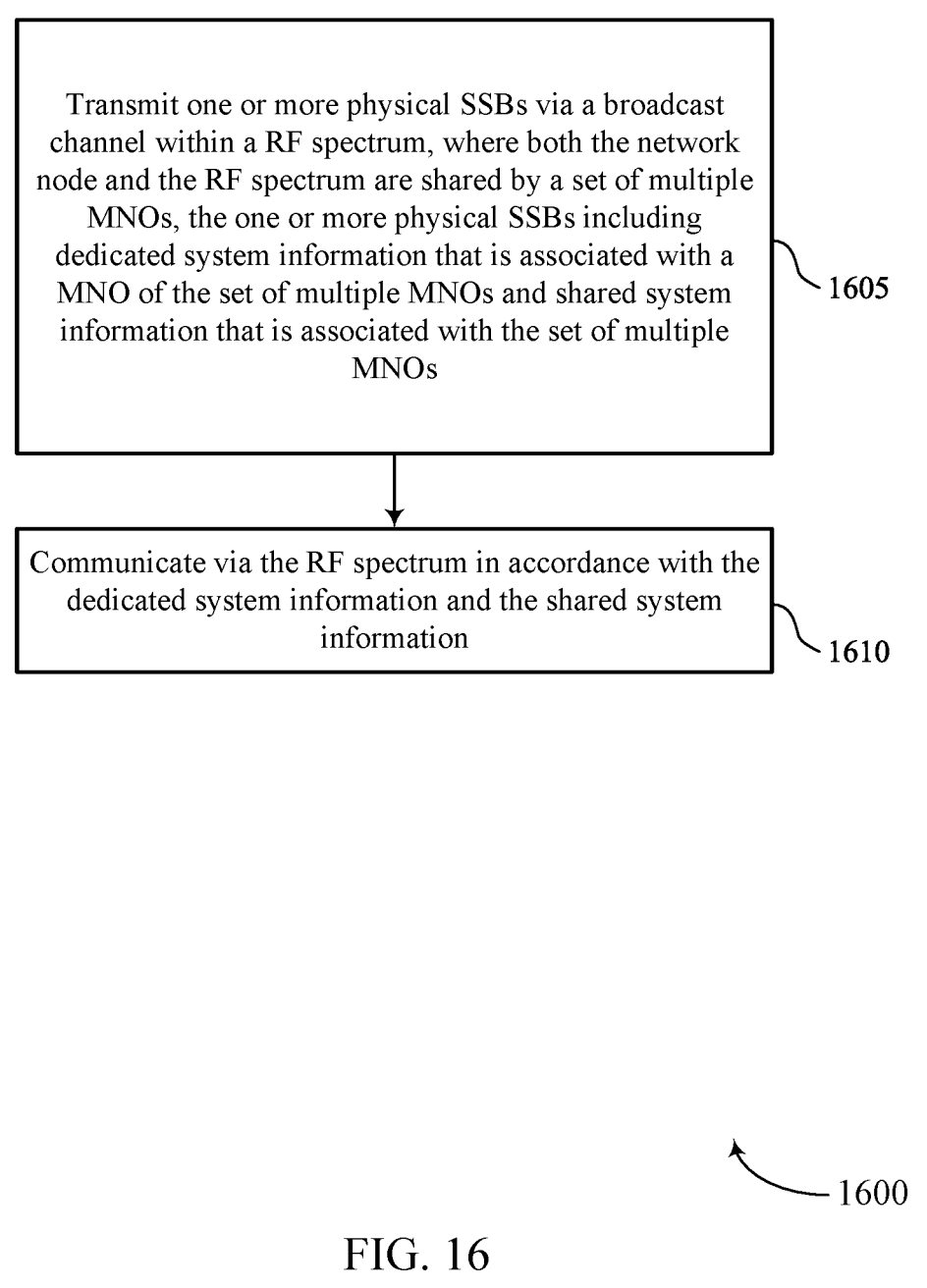

Transmit one or more physical SSBs via a broadcast channel within a RF spectrum, where both the network node and the RF spectrum are shared by a set of multiple MNOs, the one or more physical SSBs including dedicated system information that is associated with a MNO of the set of multiple MNOs and shared system information that is associated with the set of multiple MNOs

1605

Communicate via the RF spectrum in accordance with the dedicated system information and the shared system information

SYSTEM INFORMATION DESIGN IN SHARED OPEN RADIO ACCESS NETWORK RADIO UNIT SYSTEMS

FIELD OF TECHNOLOGY

The following relates to wireless communication, including system information design in shared open radio access network (O-RAN) radio unit (RU) systems.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support system information design in shared open radio access network (O-RAN) radio unit (RU) systems. For example, the described techniques provide for multiple mobile network operators (MNOs) to transmit both dedicated and common system information via broadcast signaling when sharing an RU and a radio frequency (RF) spectrum. For example, multiple MNOs may share (e.g., be associated with or utilize) a same RU. Each MNO may be associated with one or more other network entities that may be dedicated to the MNO, such as dedicated distributed units (DUs). The RU may communicate with one or more wireless devices via a shared RF spectrum. The MNOs may cooperate to ensure that transmissions via the shared RF spectrum by different MNOs do not interfere. The MNOs may transmit system information to the wireless devices to establish connections with the devices. As described herein, the MNOs may transmit broadcast signals that are capable of conveying both shared system information that is common to multiple MNOs and dedicated system information that is associated with a single MNO. By broadcasting such signals, the MNOs may refrain from transmitting multiple signals with partially repetitive information, which may reduce overhead. In some examples, the signals may be synchronization signal blocks (SSBs) that may be transmitted via a broadcast channel. The SSBs may include a master information block (MIB) that includes shared system information and indicates shared resources for a shared system information block (SIB). The SIB may be configured to indicate shared system information and dedicated system information. In some examples, the SIB may indicate a separate random access configuration for each MNO. Additionally, or alternatively, the SIB may indicate a shared random access configuration, and a random access message may include a signature sequence that is configured to indicate a corresponding MNO.

A method for wireless communication at a user equipment (UE) is described. The method may include monitoring an RF spectrum for one or more physical SSBs from a network entity and associated with an MNO, where the RF spectrum and the network entity are shared by the MNO and one or more other MNOs, receiving, based on the monitoring, the one or more physical SSBs via broadcast channel within the RF spectrum, the one or more physical SSBs including dedicated system information that is associated with the MNO and shared system information that is associated with the MNO and the one or more other MNOs, and communicating via the RF spectrum in accordance with the dedicated system information and the shared system information.

An apparatus for wireless communication at a UE is described. The apparatus may include a processor, memory coupled with the processor, and instructions stored in the memory. The instructions may be executable by the processor to cause the apparatus to monitor an RF spectrum for one or more physical SSBs from a network entity and associated with an MNO, where the RF spectrum and the network entity are shared by the MNO and one or more other MNOs, receive, based on the monitoring, the one or more physical SSBs via broadcast channel within the RF spectrum, the one or more physical SSBs including dedicated system information that is associated with the MNO and shared system information that is associated with the MNO and the one or more other MNOs, and communicate via the RF spectrum in accordance with the dedicated system information and the shared system information.

Another apparatus for wireless communication at a UE is described. The apparatus may include means for monitoring an RF spectrum for one or more physical SSBs from a network entity and associated with an MNO, where the RF spectrum and the network entity are shared by the MNO and one or more other MNOs, means for receiving, based on the monitoring, the one or more physical SSBs via broadcast channel within the RF spectrum, the one or more physical SSBs including dedicated system information that is associated with the MNO and shared system information that is associated with the MNO and the one or more other MNOs, and means for communicating via the RF spectrum in accordance with the dedicated system information and the shared system information.

A non-transitory computer-readable medium storing code for wireless communication at a UE is described. The code may include instructions executable by a processor to monitor an RF spectrum for one or more physical SSBs from a network entity and associated with an MNO, where the RF spectrum and the network entity are shared by the MNO and one or more other MNOs, receive, based on the monitoring, the one or more physical SSBs via broadcast channel within the RF spectrum, the one or more physical SSBs including dedicated system information that is associated with the MNO and shared system information that is associated with the MNO and the one or more other MNOs, and communicate via the RF spectrum in accordance with the dedicated system information and the shared system information.

A method for wireless communication at a network node is described. The method may include transmitting one or more physical SSBs via a broadcast channel within an RF spectrum, where both the network node and the RF spectrum are shared by a set of multiple MNOs, the one or more physical SSBs including dedicated system information that is associated with an MNO of the set of multiple MNOs and shared system information that is associated with the set of multiple MNOs and communicating via the RF spectrum in accordance with the dedicated system information and the shared system information.

An apparatus for wireless communication at a network node is described. The apparatus may include a processor, memory coupled with the processor, and instructions stored in the memory. The instructions may be executable by the processor to cause the apparatus to transmit one or more physical SSBs via a broadcast channel within an RF spectrum, where both the network node and the RF spectrum are shared by a set of multiple MNOs, the one or more physical SSBs including dedicated system information that is associated with an MNO of the set of multiple MNOs and shared system information that is associated with the set of multiple MNOs and communicate via the RF spectrum in accordance with the dedicated system information and the shared system information.

Another apparatus for wireless communication at a network node is described. The apparatus may include means for transmitting one or more physical SSBs via a broadcast channel within an RF spectrum, where both the network node and the RF spectrum are shared by a set of multiple MNOs, the one or more physical SSBs including dedicated system information that is associated with an MNO of the set of multiple MNOs and shared system information that is associated with the set of multiple MNOs and means for communicating via the RF spectrum in accordance with the dedicated system information and the shared system information.

A non-transitory computer-readable medium storing code for wireless communication at a network node is described. The code may include instructions executable by a processor to transmit one or more physical SSBs via a broadcast channel within an RF spectrum, where both the network node and the RF spectrum are shared by a set of multiple MNOs, the one or more physical SSBs including dedicated system information that is associated with an MNO of the set of multiple MNOs and shared system information that is associated with the set of multiple MNOs and communicate via the RF spectrum in accordance with the dedicated system information and the shared system information.

A method for wireless communication at a first network node is described. The method may include receiving, from a second network node, a broadcast message including a random access preamble, determining whether the random access preamble is intended for the first network node based on a first MNO associated with the random access preamble, where the first network node is associated with a second MNO, and transmitting a random access response message based on the first MNO associated with the random access preamble being the same as the second MNO associated with the first network node.

An apparatus for wireless communication at a first network node is described. The apparatus may include a processor, memory coupled with the processor, and instructions stored in the memory. The instructions may be executable by the processor to cause the apparatus to receive, from a second network node, a broadcast message including a random access preamble, determine whether the random access preamble is intended for the first network node based on a first MNO associated with the random access preamble, where the first network node is associated with a second MNO, and transmit a random access response message based on the first MNO associated with the random access preamble being the same as the second MNO associated with the first network node.

Another apparatus for wireless communication at a first network node is described. The apparatus may include means for receiving, from a second network node, a broadcast message including a random access preamble, means for determining whether the random access preamble is intended for the first network node based on a first MNO associated with the random access preamble, where the first network node is associated with a second MNO, and means for transmitting a random access response message based on the first MNO associated with the random access preamble being the same as the second MNO associated with the first network node.

A non-transitory computer-readable medium storing code for wireless communication at a first network node is described. The code may include instructions executable by a processor to receive, from a second network node, a broadcast message including a random access preamble, determine whether the random access preamble is intended for the first network node based on a first MNO associated with the random access preamble, where the first network node is associated with a second MNO, and transmit a random access response message based on the first MNO associated with the random access preamble being the same as the second MNO associated with the first network node.

BRIEF DESCRIPTION OF THE DRAWINGS

FIGS. 6 and 7 show block diagrams of devices that support system information design in shared O-RAN RU systems in accordance with one or more aspects of the present disclosure.

FIGS. 14 through 18 show flowcharts illustrating methods that support system information design in shared O-RAN RU systems in accordance with one or more aspects of the present disclosure.

DETAILED DESCRIPTION

Figure 1:
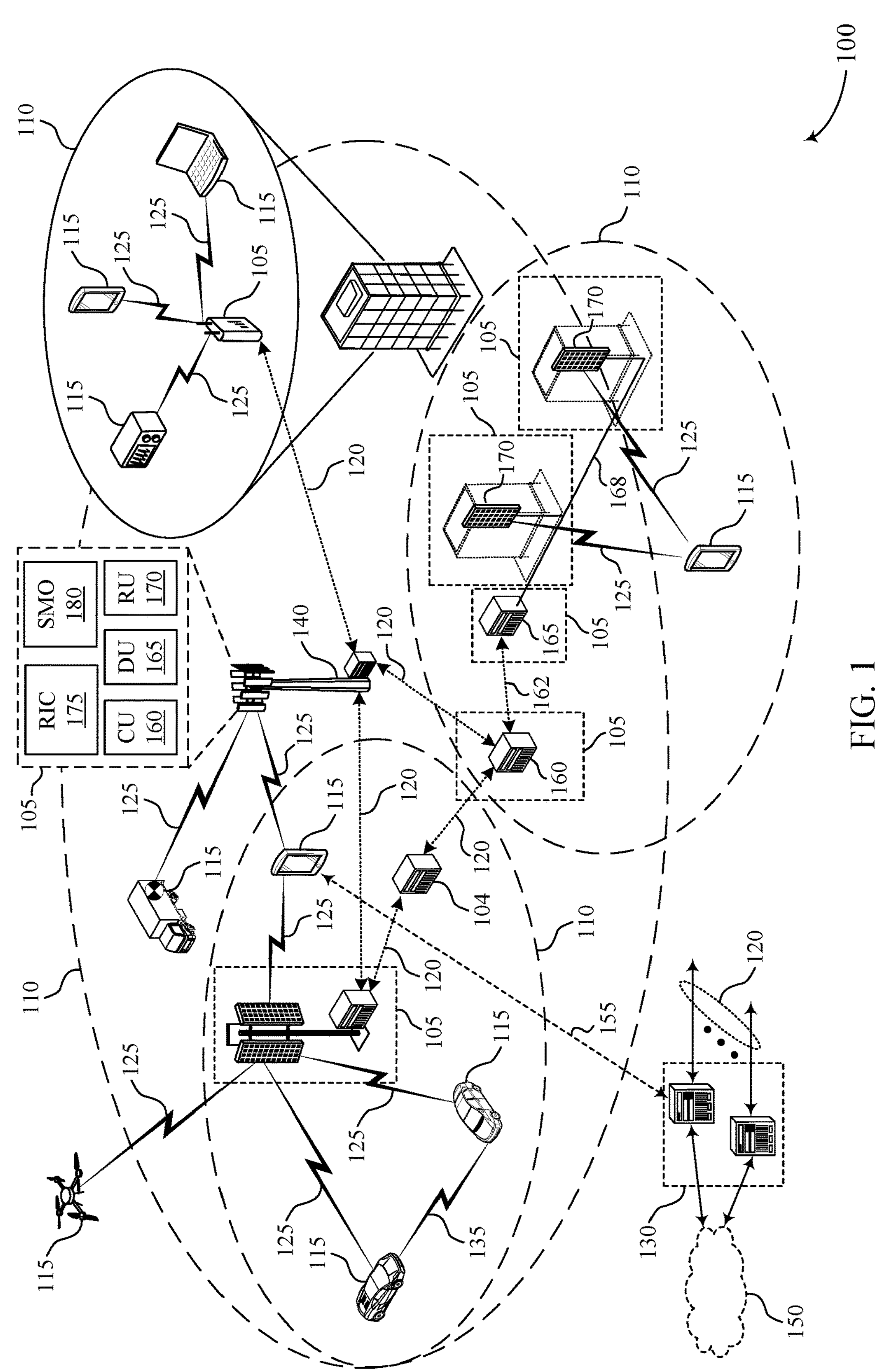
FIG. 1 shows an example of a wireless communications system that supports system information design in shared open radio access network (O-RAN) radio unit (RU) systems in accordance with one or more aspects of the present disclosure.

A mobile network operator (MNO) may provide wireless communication services to one or more client devices, such as user equipments (UEs). Some wireless communications systems may support operation of multiple different MNOs. In some examples, multiple MNOs may operate using a shared radio frequency (RF) spectrum. Each of the MNOs may be associated with (e.g., may utilize or manage) one or more respective network entities, such as a distributed unit (DU). In some examples, one or more network entities may be shared by the multiple MNOs. For example, the multiple MNOs may share or utilize a common radio unit (RU) for transmitting and receiving messages via the shared RF spectrum (referred to as spectrum sharing with shared RU). In some examples of such shared systems, each MNO may transmit respective system information to clients of the MNO, even if some of the system information is the same for the multiple MNOs. Additionally, or alternatively, some resources for a random access procedure by an MNO may be separated in time and/or frequency from resources for other random access procedures by other MNOs. Such techniques may increase overhead, and resource consumption, which may increase as a quantity of MNOs that share the RF spectrum increases.

Techniques, systems, and devices described herein provide for improved system information signaling to reduce overhead in systems that support spectrum sharing with a shared RU. For example, one or more physical synchronization signals (e.g., synchronization signal blocks (SSBs)) may be broadcast via a physical broadcast channel to multiple UEs that are associated with different MNOs. The physical synchronization signals may convey shared system information that is common to each of the different MNOs, dedicated system information that is specific to a single MNO, or both. For example, a system information block (SIB) may convey common system information and may include or be appended with a set of one or more bits or fields that indicate dedicated system information. Additionally, or alternatively, the SIB may convey the common system information and one or more dedicated messages may be transmitted to a certain UE to indicate dedicated system information associated with an MNO that serves the UE.

The SIB may indicate separate random access channel (RACH) configurations for random access procedures by each MNO or a common (e.g., shared) RACH configuration. If a common RACH configuration is indicated, techniques described herein provide for a shared RU to facilitate a random access procedure. For example, if a shared RU receives a random access message via shared random access resources, the RU may forward the random access message to all DUs. The random access message may include a sequence of bits to indicate which MNO the random access message is associated with. As such, a DU that is associated with the MNO may decode the sequence of bits and reply to the message with a random access response (RAR), while other DUs associated with other MNOs may ignore the message. The RAR may be transmitted back to the UE via the shared RU. If there are dedicated RACH configurations for each MNO, the RU may determine which MNO is associated with the random access message based on the random access resources via which the message is received. In this example, the RU may forward the random access message to an appropriate DU that is associated with the MNO.

Aspects of the disclosure are initially described in the context of wireless communications systems. Aspects of the disclosure are also described in the context of process flows. Aspects of the disclosure are further illustrated by and described with reference to apparatus diagrams, system diagrams, and flowcharts that relate to system information design in shared open radio access network (O-RAN) RU systems.

FIG. 1 shows an example of a wireless communications system 100 that supports system information design in shared O-RAN RU systems in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., an RF access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a DU 165, an RU 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c. F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support system information design in shared O-RAN RU systems as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115. The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115. In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies. Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHZ, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

As described herein, a UE 115 in the wireless communications system 100 may monitor a RF spectrum for SSBs from a network entity 105 associated with an MNO. In some cases, the RF spectrum, the network entity 105, or both, may be shared by the MNO and one or more other MNOs. In such cases, the UE 115 may receive the SSBs via a broadcast channel within the RF spectrum, and the SSBs may be shared SSBs with dedicated system information (e.g., associated with the MNO), shared system information (e.g., associated with the MNO and the one or more other MNOs), or both. Additionally, or alternatively, the UE 115 may communicate with the network entity 105 according to the dedicated system information and the shared system information included in the SSBs.

Figure 2:
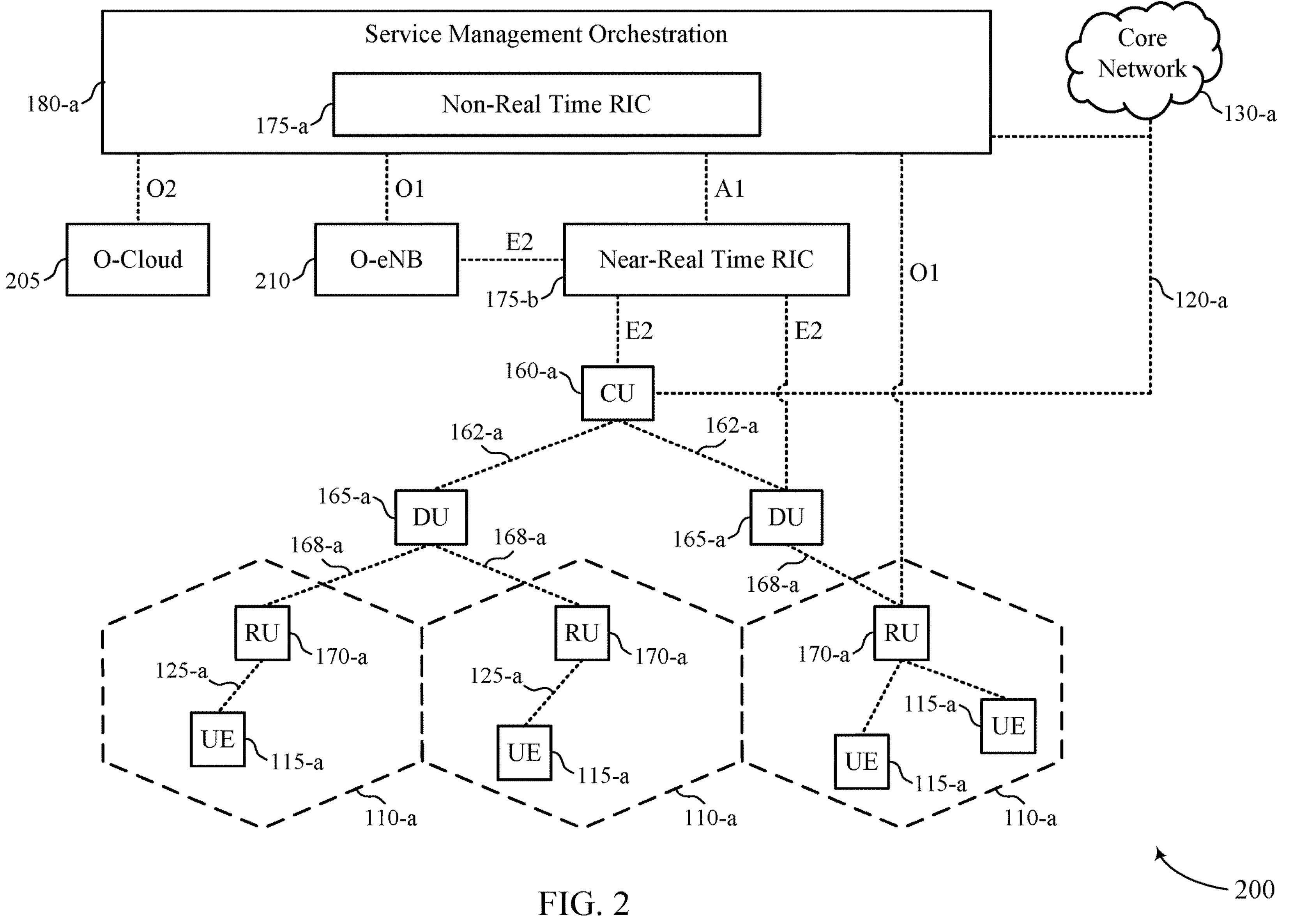
FIG. 2 shows an example of a network architecture that supports system information design in shared O-RAN RU systems in accordance with one or more aspects of the present disclosure.

FIG. 2 shows an example of a network architecture 200 (e.g., a disaggregated base station architecture, a disaggregated RAN architecture) that supports system information design in shared O-RAN RU systems in accordance with one or more aspects of the present disclosure. The network architecture 200 may illustrate an example for implementing one or more aspects of the wireless communications system 100. The network architecture 200 may include one or more CUs 160-*a* that may communicate directly with a core network 130-*a* via a backhaul communication link 120-*a*, or indirectly with the core network 130-*a* through one or more disaggregated network entities 105 (e.g., a Near-RT RIC 175-*b* via an E2 link, or a Non-RT RIC 175-*a* associated with an SMO 180-*a* (e.g., an SMO Framework), or both). A CU 160-*a* may communicate with one or more DUs 165-*a* via respective midhaul communication links 162-*a* (e.g., an F1 interface). The DUs 165-*a* may communicate with one or more RUs 170-*a* via respective fronthaul communication links 168-*a*. The RUs 170-*a* may be associated with respective coverage areas 110-*a* and may communicate with UEs 115-*a* via one or more communication links 125-*a*. In some implementations, a UE 115-*a* may be simultaneously served by multiple RUs 170-*a*.

Each of the network entities 105 of the network architecture 200 (e.g., CUs 160-*a*. DUs 165-*a*, RUs 170-*a*, Non-RT RICs 175-*a*, Near-RT RICs 175-*b*, SMOs 180-*a*, Open Clouds (O-Clouds) 205, Open eNBs (O-eNBs) 210) may include one or more interfaces or may be coupled with one or more interfaces configured to receive or transmit signals (e.g., data, information) via a wired or wireless transmission medium. Each network entity 105, or an associated processor (e.g., controller) providing instructions to an interface of the network entity 105, may be configured to communicate with one or more of the other network entities 105 via the transmission medium. For example, the network entities 105 may include a wired interface configured to receive or transmit signals over a wired transmission medium to one or more of the other network entities 105. Additionally, or alternatively, the network entities 105 may include a wireless interface, which may include a receiver, a transmitter, or transceiver (e.g., an RF transceiver) configured to receive or transmit signals, or both, over a wireless transmission medium to one or more of the other network entities 105.

In some examples, a CU 160-*a* may host one or more higher layer control functions. Such control functions may include RRC, PDCP, SDAP, or the like. Each control function may be implemented with an interface configured to communicate signals with other control functions hosted by the CU 160-*a*. A CU 160-*a* may be configured to handle user plane functionality (e.g., CU-UP), control plane functionality (e.g., CU-CP), or a combination thereof. In some examples, a CU 160-*a* may be logically split into one or more CU-UP units and one or more CU-CP units. A CU-UP unit may communicate bidirectionally with the CU-CP unit via an interface, such as an E1 interface when implemented in an O-RAN configuration. A CU 160-*a* may be implemented to communicate with a DU 165-*a*, as necessary, for network control and signaling.

A DU 165-*a* may correspond to a logical unit that includes one or more functions (e.g., base station functions, RAN functions) to control the operation of one or more RUs 170-*a*. In some examples, a DU 165-*a* may host, at least partially, one or more of an RLC layer, a MAC layer, and one or more aspects of a PHY layer (e.g., a high PHY layer, such as modules for FEC encoding and decoding, scrambling, modulation and demodulation, or the like) depending, at least in part, on a functional split, such as those defined by the 3rd Generation Partnership Project (3GPP). In some examples, a DU 165-*a* may further host one or more low PHY layers. Each layer may be implemented with an interface configured to communicate signals with other layers hosted by the DU 165-*a*, or with control functions hosted by a CU 160-*a*.

In some examples, lower-layer functionality may be implemented by one or more RUs 170-*a*. For example, an RU 170-*a*, controlled by a DU 165-*a*, may correspond to a logical node that hosts RF processing functions, or low-PHY layer functions (e.g., performing fast Fourier transform (FFT), inverse FFT (iFFT), digital beamforming, physical random access channel (PRACH) extraction and filtering, or the like), or both, based at least in part on the functional split, such as a lower-layer functional split. In such an architecture, an RU 170-*a* may be implemented to handle over the air (OTA) communication with one or more UEs 115-*a*. In some implementations, real-time and non-real-time aspects of control and user plane communication with the RU(s) 170-*a* may be controlled by the corresponding DU 165-*a*. In some examples, such a configuration may enable a DU 165-*a* and a CU 160-*a* to be implemented in a cloud-based RAN architecture, such as a vRAN architecture.

The SMO 180-*a* may be configured to support RAN deployment and provisioning of non-virtualized and virtualized network entities 105. For non-virtualized network entities 105, the SMO 180-*a* may be configured to support the deployment of dedicated physical resources for RAN coverage requirements which may be managed via an operations and maintenance interface (e.g., an O1 interface). For virtualized network entities 105, the SMO 180-*a* may be configured to interact with a cloud computing platform (e.g., an O-Cloud 205) to perform network entity life cycle management (e.g., to instantiate virtualized network entities 105) via a cloud computing platform interface (e.g., an O2 interface). Such virtualized network entities 105 can include, but are not limited to, CUs 160-*a*, DUs 165-*a*, RUs 170-*a*, and Near-RT RICs 175-*b*. In some implementations, the SMO 180-*a* may communicate with components configured in accordance with a 4G RAN (e.g., via an O1 interface). Additionally, or alternatively, in some implementations, the SMO 180-*a* may communicate directly with one or more RUs 170-*a* via an O1 interface. The SMO 180-*a* also may include a Non-RT RIC 175-*a* configured to support functionality of the SMO 180-*a*.

The Non-RT RIC 175-*a* may be configured to include a logical function that enables non-real-time control and optimization of RAN elements and resources, Artificial Intelligence (AI) or Machine Learning (ML) workflows including model training and updates, or policy-based guidance of applications/features in the Near-RT RIC 175-*b*. The Non-RT RIC 175-*a* may be coupled to or communicate with (e.g., via an A1 interface) the Near-RT RIC 175-*b*. The Near-RT RIC 175-*b* may be configured to include a logical function that enables near-real-time control and optimization of RAN elements and resources via data collection and actions over an interface (e.g., via an E2 interface) connecting one or more CUs 160-*a*, one or more DUs 165-*a*, or both, as well as an O-eNB 210, with the Near-RT RIC 175-*b*.

In some examples, to generate AI/ML models to be deployed in the Near-RT RIC 175-*b*, the Non-RT RIC 175-*a* may receive parameters or external enrichment information from external servers. Such information may be utilized by the Near-RT RIC 175-*b* and may be received at the SMO

180-*a* or the Non-RT RIC 175-*a* from non-network data sources or from network functions. In some examples, the Non-RT RIC 175-*a* or the Near-RT RIC 175-*b* may be configured to tune RAN behavior or performance. For example, the Non-RT RIC 175-*a* may monitor long-term trends and patterns for performance and employ AI or ML models to perform corrective actions through the SMO 180-*a* (e.g., reconfiguration via O1) or via generation of RAN management policies (e.g., A1 policies).

As described herein, a UE 115-*a* may monitor a RF spectrum for SSBs from a network entity 105 associated with an MNO. The network entity 105 may be, for example, an RU 170-*a*. In some cases, the RF spectrum, the RU 170-*a*, or both, may be shared by the MNO and one or more other MNOs. The RU 170-*a* may be in communication with one or more other network nodes, such as one or more DUs 165-*a* and/or CUs 160-*a*. The DUs 165-*a* and CUs 160-*a* may be dedicated network nodes, such that each network node may be associated with (e.g., may serve) a respective MNO. In such cases, the UE 115-*a* may receive the SSBs via a broadcast channel within the RF spectrum, and the SSBs may be shared SSBs with dedicated system information (e.g., associated with the MNO), shared system information (e.g., associated with the MNO and the one or more other MNOs), or both. Additionally, or alternatively, the UE 115-*a* may communicate with the RU 170-*a* according to the dedicated system information and the shared system information included in the SSBs.

Figure 3:
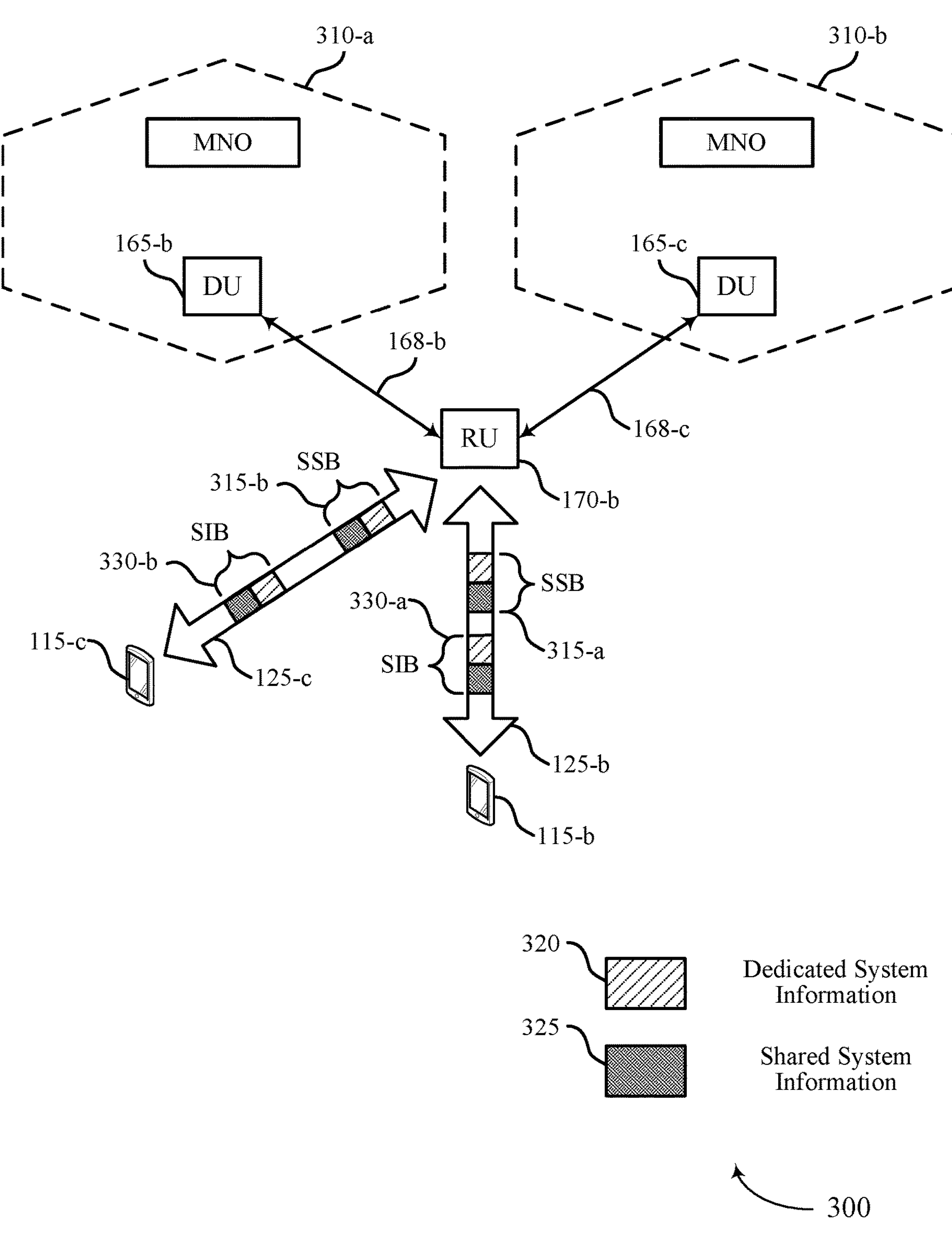
FIG. 3 shows an example of a wireless communications system that supports system information design in shared O-RAN RU systems in accordance with one or more aspects of the present disclosure.

FIG. 3 shows an example of a wireless communications system 300 that supports system information design in shared O-RAN RU systems in accordance with one or more aspects of the present disclosure. The wireless communications system 300 may implement or be implemented by aspects of the wireless communications system 100 and/or the network architecture 200. For example, the wireless communications system 300 may include UEs 115-*b* and 115-*c*, an RU 170-*b*, and DUs 165-*b* and 165-*c*, which may represent examples of a UE 115, an RU 170, and a DU 165, as described with reference to FIGS. 1 and 2. The RU 170-*b* may communicate with the UEs 115-*b* and 115-*c* via the communication links 125-*b* and 125-*c*, respectively, which may be Uu links, in some examples. The RU 170-*b* may communicate with one or more DUs 165, such as the DUs 165-*b* and 165-*c*, via respective fronthaul communication links 168 (e.g., fronthaul communication links 168-*b* and 168-*c*), which may represent an example of the fronthaul communication links 168 described with reference to FIG. 2. In some examples, multiple MNOs 310 (e.g., MNO 310-*a* and MNO 310-*b*) may share a same RU 170-*b* for communications with client devices, such as the UEs 115-*b* and 115-*c*.

In this example, the MNOs 310-*a* and 310-*b* may share the RU 170-*b*. That is, the MNOs 310-*a* and 310-*b* may operate their networks independently, but may both utilize the same RU 170-*b*. The RU 170-*b* may support open fronthaul interface and may, in some examples, be referred to as an open RU (O-RU). The rest of the network nodes within each MNO 310 may be independent. For example, each MNO 310 may be associated with (e.g., may utilize or manage) one or more respective dedicated network nodes, such as the DUs 165-*b* and 165-*c*. The DU 165-*b* may be a dedicated network node associated with the MNO 310-*a* and the DU 165-*c* may be a dedicated network node associated with the MNO 310-*b*. The network nodes may additionally, or alternatively, include one or more CUs (not illustrated in FIG. 3) or other types of network nodes, which may also be referred to as network entities herein.

The MNOs 310-*a* and 310-*b* may additionally, in this example, support spectral sharing. The MNO 310-*a* may operate using a same RF spectrum as the MNO 310-*b* (e.g., both networks may operate on a same frequency and using a same channel). For example, the communication links 125-*b* and 125-*c* may be associated with (e.g., include or be conveyed via) a same shared RF spectrum. The MNOs 310-*a* and 310-*b* may coordinate which MNO 310 is using the shared RF spectrum at a given time, to reduce interference. In some examples, the MNOs 310-*a* and 310-*b* may perform TDM when scheduling data to avoid the MNO 310-*a* scheduling data on a same resource as the MNO 310-*b*, or vice versa. The RU 170-*b* may support communications via the shared RF spectrum.

The MNO 310-*a* and the MNO 310-*b* may each be associated with a respective set of overhead signals and channels (e.g., SSB, master information block (MIB), SIB, or other system information). As such, overhead in the system may linearly scale as a quantity of MNOs 310 that share the same RU 170-*b* and/or RF spectrum increases. For example, if there are four more MNOs 310 (not pictured in FIG. 3) that share the RU 170-*b* and RF spectrum, the overhead may increase by approximately a factor of four as compared with overhead in the system with two MNOs 310-*a* and 310-*b*. Such overhead may overwhelm system capacity, in some examples, which may reduce throughput and reliability of wireless communications. In some systems, the MNOs 310 may support RAN sharing (e.g., may share an entire RAN and corresponding components). Such MNOs 310 may share system information. In some examples, however, MNOs 310 that share an RU 170, but support different DUs 165 or other network nodes, may not have the same system information.

Techniques, systems, and devices described herein provide for a fronthaul design that supports transmission of both shared system information 325 that is shared across the multiple MNOs 310 and dedicated system information 320 that is associated with (e.g., specific to) a single MNO 310. Such partial system information sharing may support improved throughput and reliability in a system in which multiple MNOs 310 share a same RU 170 and RF spectrum. The signaling for conveying system information as described herein may be flexible, such that some symbols and/or channels may be common and may convey shared system information 325 to reduce overhead, and other symbols and/or channels may be dedicated to a single MNO 310 and may convey dedicated system information 320 for that MNO 310 to support MNO optimization.

The system information may be conveyed via one or more SSBs 315, which may be referred to as physical SSBs 315 and may represent an example of a physical synchronization signal conveyed via a primary broadcast channel. As described herein, the SSBs 315 may be shared among all MNOs 310 that share a same RU 170-*b* and RF spectrum. For example, the SSBs 315 may be transmitted to multiple UEs 115 (e.g., client devices) via a broadcast channel within the RF spectrum. The SSBs 315 may include one or more types of system information, such as a MIB, a SIB configuration, a PRACH configuration, one or more other types of system information, or any combination thereof. Each type of system information may include shared system information 325, dedicated system information 320, or both.

The SSBs 315 may convey a cell defining signal (e.g., a cell defining SSB) that may be common for each of the MNOs 310. That is, there may be no differentiation between MNOs 310 with respect to the cell definition (e.g., all MNOs 310 may share a same cell). The SSBs 315 may be used by one or more UEs 115 to find and connect with a network entity, such as the RU 170-*b*. Because the RU 170-*b* is shared by the MNOs 310, there may be relatively small differences in the SSBs 315 for different MNOs 310.

In some examples, the SSBs 315 may convey a MIB, and the MIB may be common for each of the MNOs 310 (e.g., no MNO-specific differentiation for the MIB). In the example of FIG. 3, the same MIB may be broadcast via both of the SSBs 315-*a* and 315-*b*. The MIB may include a pointer to a SIB 330 (e.g., SIB-1). For example, the MIB may include a physical downlink control channel (PDCCH) configuration for the SIB 330. The PDCCH configuration may indicate one or more PDCCH resources that are allocated or reserved for transmission of the SIB 330. The PDCCH configuration for the SIB 330 may thereby be common across each of the MNOs 310, such that each MNO 310 may share a same broadcast SIB 330 transmitted via the indicated PDCCH resources. The MIB may additionally, or alternatively, indicate one or more other types of shared system information 325, such as a common SFN, a default subcarrier spacing (SCS), an SSB subcarrier offset, one or more cell barring parameters, one or more cell reselection parameters, or any combination thereof. Such shared system information 325 may be associated with communications in accordance with each of the MNOs 310 that share the RU 170-*b*.

Some other portions of the SSBs 315 may be shared signals that may support dedicated system information 320 in addition to or as an alternative to the shared system information 325. For example, the MIB may indicate shared resources for transmission of a SIB 330, such that the SIB 330 may be a common broadcast SIB 330. Each MNO 310 may share the SIB 330, and the SIB 330 may support both dedicated system information 320 (e.g., MNO-specific) and shared system information 325. That is, MNO-specific information may be permitted within a common SIB 330.

In some examples, the SIB 330 may include a default or shared portion for conveying shared system information 325 that is common to each of the MNOs 310, and the SIB 330 may include or be appended with an extension that may include one or more bits or fields configured to covey dedicated system information 320 (e.g., a shared SIB configuration with MNO extension). Each MNO 310 may thereby append or add dedicated system information 320 (e.g., MNO-specific optimization information) to the shared SIB 330. In some examples, the resources for the extension (e.g., an eSIB-1 extension) may count or be treated as MNO-specific resources (instead of the shared resources via which the SIB 330 is received). In some examples, the SIB 330 may be divided into multiple blocks due to size. For example, the SIB 330 may be transmitted via multiple separate messages based on the added dedicated system information 320.

In some other examples, each MNO may be associated with one or more defined SIB blueprints. In such cases, a UE 115, such as the UE 115-*b*, may connect to the system in accordance with shared system information 325 conveyed via a shared SIB 330. After connecting to the system, the UE 115-*b* may receive an indication of one or more MNO-specific tags for the UE 115-*b*. The UE 115-*b* may receive a tag, which may also be referred to as a blueprint herein, via one or more messages that may also include dedicated system information 320 associated with the MNO 310-*b*. In some examples, the UE 115-*b* may receive the tags after establishing a connection with the network. For example, the tags may be indicated to the UE 115-*b* via dedicated signaling, or some other type of signaling. The UE 115-*b* may store the tag (e.g., may download the tag) and may use the tag to receive dedicated system information 320 associated with the MNO 310-*b* via subsequent shared SIBs 330. For example, the one or more tags may be associated with definitions or legends for identifying dedicated system information 320 based on broadcast messages. Each MNO 310 may be associated with one or more respective tags.

The SIB 330 may include multiple types of system information, including one or more physical channel configurations, upper layer channel configurations, PRACH configurations, one or more other types of system information, or any combination thereof. The PRACH configuration may correspond to a configuration of one or more resources for a random access procedure by a UE 115. The PRACH configuration may be either dedicated (e.g., MNO-specific) or shared across multiple MNOs 310. A dedicated PRACH configuration may be associated with a separate set of resources for each MNO 310, where each set of resources is orthogonal in frequency, time, or both. If the PRACH configuration is dedicated, the RU 170-*b* may determine which MNO 310 is associated with a received random access message based on the resources via which the random access message is received. For example, the UE 115-*b* may transmit a random access message (e.g., or some other uplink message) via a set of dedicated resources that are associated with the MNO 310-*b*. The RU 170-*b* may determine that the uplink message is intended for or associated with the MNO 310-*b* based on the uplink message being received via the dedicated resources. The RU 170-*b* may forward the uplink message directly to the DU 165-*c* (e.g., and not to the DU 165-*b*) accordingly.

If the PRACH configuration is shared, an uplink message may be received via shared resources and the RU 170-*b* may be unable to differentiate between MNOs 310. In such cases, a first random access message, which may be referred to as a random access preamble (e.g., Msg1) may be configured to differentiate between MNOs 310. For example, the UE 115-*b* may indicate, via the first random access message, a sequence of bits or a field configured to indicate which MNO 310 the random access procedure is targeting. The RU 170-*b* may broadcast the uplink message to all DUs 165, and the DUs 165 may use the sequence of bits or field to determine whether the uplink message is associated with an MNO 310 that corresponds to the DU 165 or not. Techniques for differentiating between MNOs 310 during random access procedures are described in further detail elsewhere herein, including with reference to FIG. 4.

In the example of FIG. 3, the UE 115-*b* may be associated with (e.g., connected to and/or served by) the MNO 310-*b*, and the UE 115-*c* may be associated with (e.g., connected to and/or served by) the MNO 310-*a*. The RU 170-*b* may broadcast an SSB 315 via a primary broadcast channel in the shared RF spectrum to both the UE 115-*b* and the UE 115-*c*. The UE 115-*c* may receive the SSB 315-*b* and the UE 115-*b* may receive the SSB 315-*a*. Although labeled as separate signals, it is to be understood that the SSBs 315-*a* and 315-*b* are broadcast signals that are common to (e.g., shared by) both of the MNOs 310-*a* and 310-*b*.

In some examples, the SSBs 315-*a* and 315-*b* may include a MIB that includes shared system information 325 that can be used by both the UE 115-*b* and the UE 115-*c* to connect to the RU 170-*b*. The MIB may indicate shared resources for a SIB. The UE 115-*b* and the UE 115-*c* may monitor for and receive the SIB 330-*a* and the SIB 330-*b*, respectively, via the shared resources. Although labeled as separate signals, it is to be understood that the SIBs 330-*a* and 330-*b* are broadcast signals received via shared resources that are common to (e.g., shared by) both of the MNOs 310-*a* and 310-*b*. The shared SIB 330 may include shared system information 325 and dedicated system information 320. For example, the SIB 330-*a* may include, indicate, or be appended with some dedicated system information 320 that is associated with the MNO 310-*a* and is intended for the UE 115-*c* (e.g., information specific to establishing a connection between the UE 115-*c* and the MNO 310-*a*), and the SIB 330-*b* may include, indicate, or be appended with some dedicated system information 320 that is associated with the MNO 310-*b* and is intended for the UE 115-*b* (e.g., information specific to establishing a connection between the UE 115-*b* and the MNO 310-*b*).

The wireless communications system 300 may thereby support design of physical synchronization signals (e.g., SSBs, SIBs, MIBs, or the like) that are broadcast to multiple UEs 115 by a shared RU 170-*b* and that include dedicated system information 320, shared system information 325, or both. The system information signaling design described herein may provide for reduced overhead, improved throughput, and improved reliability as compared with systems in which each MNO 310 transmits separate system information.

Figure 4:
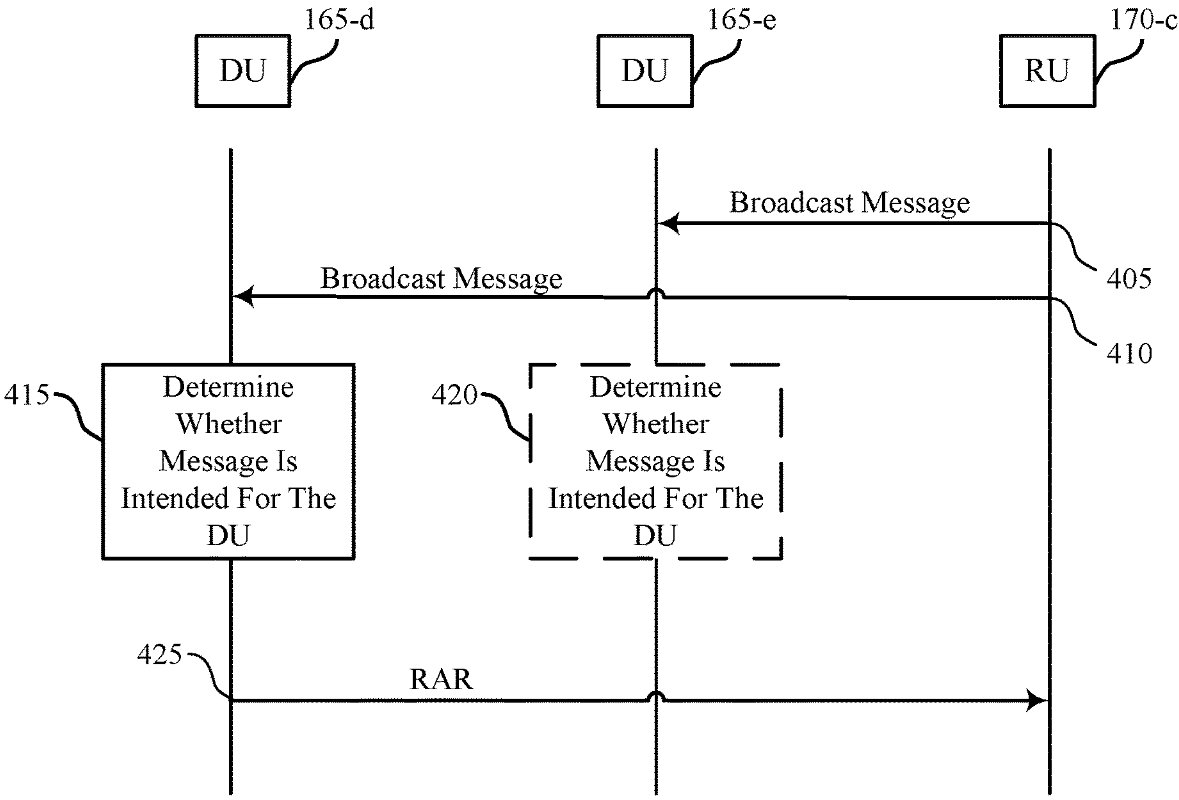
FIG. 4 shows an example of a process flow that supports system information design in shared O-RAN RU systems in accordance with one or more aspects of the present disclosure.

FIG. 4 shows an example of a process flow 400 that supports system information design in shared O-RAN RU systems in accordance with one or more aspects of the present disclosure. In some examples, the process flow 400 may implement or be implemented by aspects of the wireless communications system 100, the network architecture 200, the wireless communications system 300, or any combination thereof, as described with reference to FIGS. 1-3. For example, the process flow 400 may include a DU 165-*d*, a DU 165-*e*, and an RU 170-*c* which may be examples of corresponding devices as described with reference to FIGS. 1-3. Alternative examples of the following may be implemented, where some steps are performed in a different order than described or are not performed at all. In some cases, steps may include additional features not mentioned below, or further steps may be added. Although the DUs 165-*d* and 165-*e* and the RU 170-*c* are shown performing the operations of the process flow 400, some aspects of some operations may also be performed by one or more other wireless devices.

In some cases, the DU 165-*d* may be associated with a first MNO and the DU 165-*e* may be associated with a second MNO that is different than the first MNO, such as the DUs 165-*b* and 165-*c* described with reference to FIG. 3. The first MNO and the second MNO may share the RU 170-*c*. For example, the first MNO and the second MNO associated with the DU 165-*d* and the DU 165-*e*, respectively, may share the RU 170-*c* for transmitting and receiving messages via a shared radio frequency spectrum (e.g., spectrum sharing with the shared RU 170-*c*).

In this example, the RU 170-*c* may receive an uplink message from a wireless device, such as a UE 115. The UE 115 may be associated with (e.g., attempting to connect to) the first MNO. The uplink message may include a random access preamble (e.g., Msg1) in this example. However, it is to be understood that the uplink message may include any type of uplink message intended for a certain MNO.

The RU 170-*c* may have previously transmitted system information, such as a SIB, to the UE 115. The system information may include a shared PRACH configuration, as described with reference to FIG. 3. For example, the system information may indicate a common set of random access resources for transmission of a random access message, where the resources may be the same for each MNO. In such examples, the random access preamble may be transmitted by the UE 115 via the shared random access resources indicated by the shared PRACH configuration. The RU 170-*c* may thereby not know which MNO is associated with the random access preamble. However, the random access preamble as described herein may include one or more bits or fields (e.g., a signature sequence) to indicate the MNO. The UE 115 may apply the signature sequence to the random access preamble, in some examples, by appending a set of bits or scrambling the preamble with a set of bits, or the like.

At 405 and 410, the RU 170-*c* may forward the uplink message to both the DU 165-*d* and the DU 165-*c*. That is, the RU 170-*c* may broadcast the message to each DU 165 that is in communication with the RU 170-*c*. The RU 170-*c* may broadcast the uplink message to the multiple DUs 165 in the event that the message is received via shared resources. That is, because the RU 170-*c* may be unable to identify which MNO is the intended target of the uplink message, the RU 170-*c* may broadcast the uplink message to all MNOs that share the RU 170-*c*. Additionally, or alternatively, in some examples, the uplink message may be received via dedicated resources, and the RU 170-*c* may still forward the message to all of the DUs 165 (e.g., to reduce processing and/or complexity at the RU 170-*c*). In some examples, the broadcast message may be a representation of the uplink message. For example, the RU 170-*c* may forward in-phase and quadrature (I&Q) samples for common uplink resources to all DUs 165.

At 415 and 420, the DUs 165-*d* and 165-*e* may determine whether the uplink message (e.g., random access preamble) is intended for them. That is, the DUs 165-*d* and 165-*e* may determine an intended target for the uplink message. The DUs 165-*d* and 165-*e* may decode the message and identify a signature sequence conveyed via the message (e.g., a set of bits or a scrambling sequence). The DUs 165-*d* and 165-*e* may compare the signature sequence with a sequence that is associated with (e.g., that identifies or represents) the MNO associated with the respective DU 165. Each MNO may be associated with a disjoint set of signature sequences. In some examples, the sequences associated with the MNOs may be configured upon deployment of the devices, or may be indicated via control signaling. In the example of FIG. 4, the DU 165-*d* may match the signature sequence in the uplink message with a group of one or more sequences that represents the first MNO, and the DU 165-*e* may determine that the signature sequence in the uplink message is different than a group of one or more sequences that represents the second MNO.

In some other examples, there may be one or more messages or bits appended to the uplink message that identify the target MNO. In such cases, the DUs 165-*d* and 165-*e* may decode the appended messages to determine whether the uplink message is intended for them or not. In some other examples, if the system supports dedicated PRACH configurations, the uplink message is received at the RU 170-*c* via dedicated resources, and the RU 170-*c* broadcasts the uplink message to all of the DUs 165, the DUs 165 may determine whether the message is intended for them based on the resource configuration. For example, if the second MNO associated with the DU 165-*e* does not have configured resources, the DU 165-*e* may ignore the uplink message. If the uplink message is received via dedicated resources configured for the first MNO, the DU 165-*d* may respond to the uplink message accordingly.

At 425, the DU 165-*d* may transmit a responsive message to the RU 170-*c* for distribution to the UE 115 via the fronthaul. If the uplink message is a random access preamble, the responsive message may be an RAR message. The DU 165-*d* transmits the RAR based on the DU 165-*d* determining, at 415, that the uplink message is associated with the first MNO and intended for the DU 165-*d*. The DU 165-*e* may ignore the uplink message and may refrain from responding.

An uplink message that is transmitted via resources shared by multiple MNOs in a shared RU and RF spectrum system may thereby include one or more bits or sequences that indicate a corresponding MNO. The described MNO differentiation techniques may provide for the DUs 165 to determine whether to reply to the uplink message or not, which may improve reliability, coordination between devices, and throughput.

Figure 5:
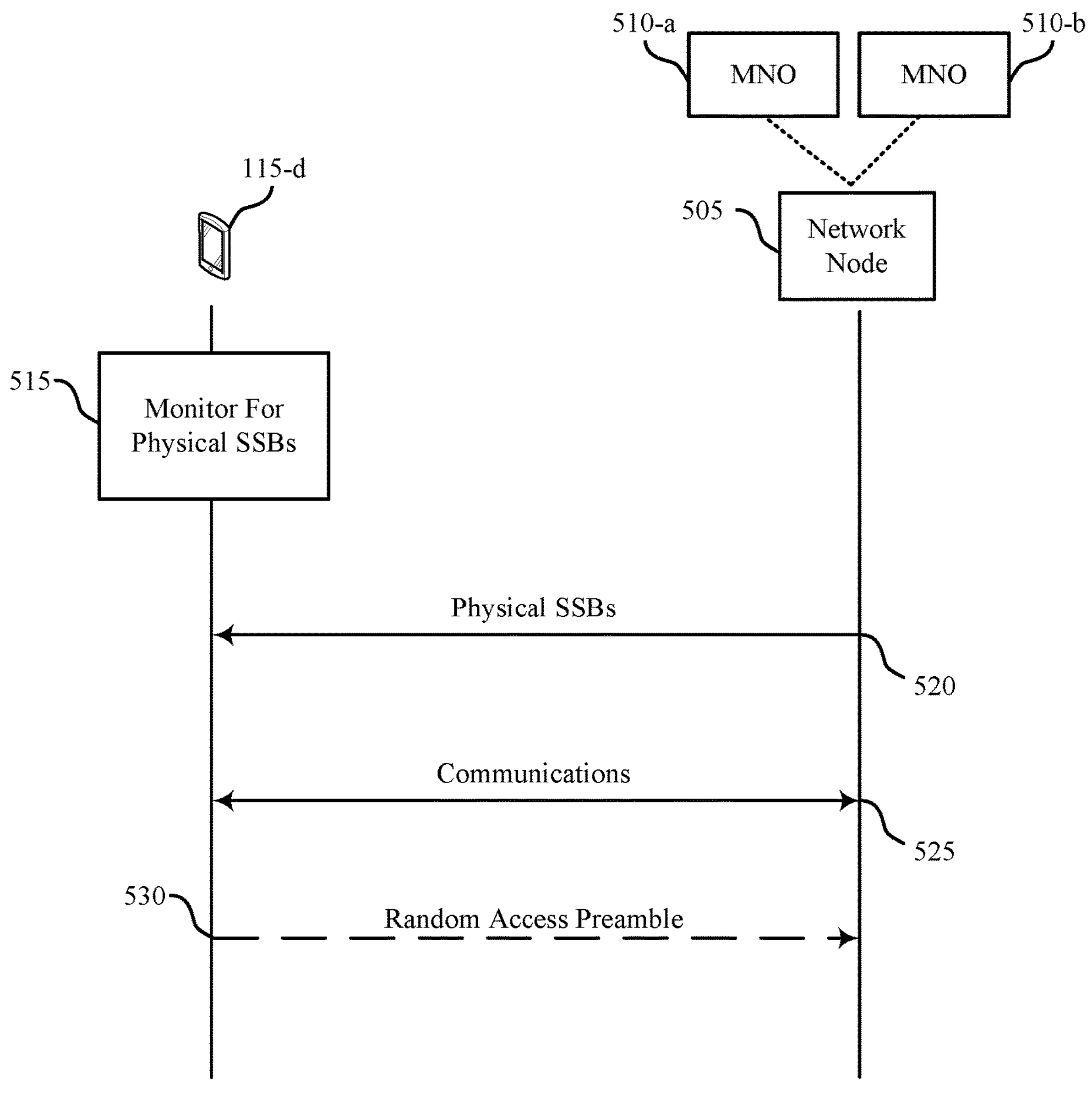
FIG. 5 shows an example of a process flow that supports system information design in shared O-RAN RU systems in accordance with one or more aspects of the present disclosure.

FIG. 5 shows an example of a process flow 500 that supports system information design in shared O-RAN RU systems in accordance with one or more aspects of the present disclosure. In some examples, the process flow 500 may implement or be implemented by aspects of the wireless communications system 100, the network architecture 200, the wireless communications system 300, or any combination thereof. For example, the process flow 500 may include a UE 115-*d* which may be an example of corresponding devices herein as described in FIGS. 1-4. Alternative examples of the following may be implemented, where some steps are performed in a different order than described or are not performed at all. In some cases, steps may include additional features not mentioned below, or further steps may be added. Although the UE 115-*d* and a network node 505 are shown performing the operations of the process flow 500, some aspects of some operations may also be performed by one or more other wireless devices.

In some examples, an MNO 510-*a* and an MNO 510-*b* may share the network node 505. For example, the network node 505 may be an example of a network entity, an RU, or the like. In some cases, the network node 505 may transmit signals to the UE 115-*d* on an RF spectrum. The RF spectrum may be shared by the MNO 510-*a*, the MNO 510-*b*, or both.

At 515, the UE 115-*d* may monitor for physical SSBs. For example, the UE 115-*d* may monitor the RF spectrum for one or more physical SSBs from the network node 505 and an associated MNO (e.g., the MNO 510-*a* or the MNO 510-*b*).

At 520, the network node 505 may transmit physical SSBs to the UE 115-*d*. For example, the UE 115-*d* may receive the one or more physical SSBs via a broadcast channel within the RF spectrum based on the monitoring. In some cases, the one or more physical SSBs may include dedicated system information that is associated with the MNO 510-*a* and shared system information that is associated with the MNO 510-*a* and the one or more other MNOs (e.g., the MNO 510-*b*). For example, the physical SSBs may include shared system information, MNO-specific system information, or both.

In some examples, as part of transmitting the physical SSBs, the network node 505 may transmit, to the UE 115-*d*, a broadcast information block (e.g., a MIB) that is common to the MNO 510-*a*, the MNO 510-*b*, and one or more other MNOs. For example, the network node 505 may transmit the broadcast information block via a broadcast channel to convey at least a portion of the shared system information that is common to a quantity of MNOs. The shared system information may include an indication of an SFN, an SCS, an SSB subcarrier offset, one or more cell barring parameters, one or more cell reselection parameters, one or more other system parameters, or any combination thereof for communications in accordance with the multiple MNOs 510-*a* and 510-*b*.

In some cases, the UE 115-*d* may receive, via the broadcast information block, an indication of one or more downlink control channel resources allocated for a common SIB associated with the MNO 510-*a* and the one or more other MNOs (e.g., the MNO 510-*b*). For example, the one or more downlink control channel resources may be shared resources that are common to the MNO 510-*a* and the MNO 510-*b*. In some cases, the broadcast information block may include the indication of one or more downlink control channel resources for a common SIB for shared system information that is common to the quantity of MNOs.

In some cases, the UE 115-*d* may receive a broadcast SIB via the one or more resources indicated via the information block. The resources may be common to the MNO 510-*a* and the one or more other MNOs (e.g., the MNO 510-*b*). The broadcast SIB may include at least the shared system information associated with the MNO 510-*a* and the MNO 510-*b*.

In some examples, the UE 115-*d* may receive a SIB extension including one or more fields that indicate the dedicated system information associated with the MNO 510-*a*. For example, the UE 115-*d* may receive the SIB extension via one or more second resources that are associated with the MNO 510-*a* (e.g., dedicated resources). In some cases, the UE 115-*d* may receive a quantity of messages including the broadcast SIB based on a size of the broadcast SIB exceeding a threshold size. For example, the SIB may be divided into and transmitted as the quantity of messages due to size. In some cases, the broadcast SIB may include the shared system information and the dedicated system information associated with the MNO 510-*a*. For example, the SIB may be transmitted via the quantity of messages based on the added dedicated system information.

In some cases, the UE 115-*d* may receive one or more messages including the dedicated system information associated with the MNO 510-*a* and a tag for determining subsequent system information for the MNO 510-*a*. In some cases, the UE 115-*d* may store the tag for subsequent communications by the MNO 510-*a*. For example, the UE 115-*d* may download and use the tag to receive dedicated system information associated with the MNO 510-*a*, as described in further detail elsewhere herein, including with reference to FIG. 3.

The broadcast SIB may indicate a set of one or more resources for a PRACH procedure associated with the multiple MNOs 510-*a* and 510-*b*. In some examples, the resources may be common to the multiple MNOs 510. Additionally, or alternatively, the broadcast SIB may indicate a quantity of subsets of resources within the set of one or more resources. The quantity of subsets of resources may be separated in a time domain, in a frequency domain, or both, and each subset may be associated with a respective MNO 510 (e.g., the MNO 510-*a* or the MNO 510-*b*).

At 525, the UE 115-*d* and the network node 505 may communicate via the RF spectrum in accordance with the dedicated system information and the shared system information. The communicating may include, for example, performing a PRACH procedure for the UE 115-*d* to establish a connection with the network (e.g., via a certain MNO 510), exchanging one or more dedicated signals, or some other types of communications.

At 530, in some examples, as part of the communicating, the UE 115-*d* may transmit a random access preamble to the network node 505. For example, if the broadcast SIB indicates the set of one or more resources for a PRACH procedure, the UE 115-*d* may transmit the random access preamble (e.g., Msg1) associated with the MNO 510-*a* via the set of one or more resources. The network node 505 may forward the random access preamble to a quantity of other network nodes (e.g., DUs) based on the set of one or more resources being common to the MNO 510-*a* and the one or more other MNOs 510. The random access preamble may include a sequence that indicates the MNO 510-*a*, the MNO 510-*b*, or both based on the set of one or more resources being common to the MNO 510-*a* and the one or more other MNOs 510. Additionally, or alternatively, the network node 505 may determine that the random access preamble is associated with the MNO 510-*a* based on a subset of resources via which the random access preamble is received if, for example, the one or more resources for the PRACH procedure includes subsets of resources that are separated in a time domain, in a frequency domain, or both. Techniques for differentiating between MNOs 510 when receiving uplink messages are described in further detail elsewhere herein, including with reference to FIGS. 3 and 4.

FIG. 6 shows a block diagram 600 of a device 605 that supports system information design in shared O-RAN RU systems in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to system information design in shared O-RAN RU systems). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to system information design in shared O-RAN RU systems). In some examples, the transmitter 615 may be co-located with a receiver 610 in a transceiver. The transmitter 615 may utilize a single antenna or a set of multiple antennas.

The communications manager 620, the receiver 610, the transmitter 615, or various combinations thereof or various components thereof may be examples of means for performing various aspects of system information design in shared O-RAN RU systems as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a UE in accordance with examples as disclosed herein. For example, the communications manager 620 is capable of, configured to, or operable to support a means for monitoring a RF spectrum for one or more physical SSBs from a network entity and associated with a MNO, where the RF spectrum and the network entity are shared by the MNO and one or more other MNOs. The communications manager 620 is capable of, configured to, or operable to support a means for receiving, based on the monitoring, the one or more physical SSBs via broadcast channel within the RF spectrum, the one or more physical SSBs including dedicated system information that is associated with the MNO and shared system information that is associated with the MNO and the one or more other MNOs. The communications manager 620 is capable of, configured to, or operable to support a means for communicating via the RF spectrum in accordance with the dedicated system information and the sharing system information.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for more efficient utilization of communication resources.

Figure 7:
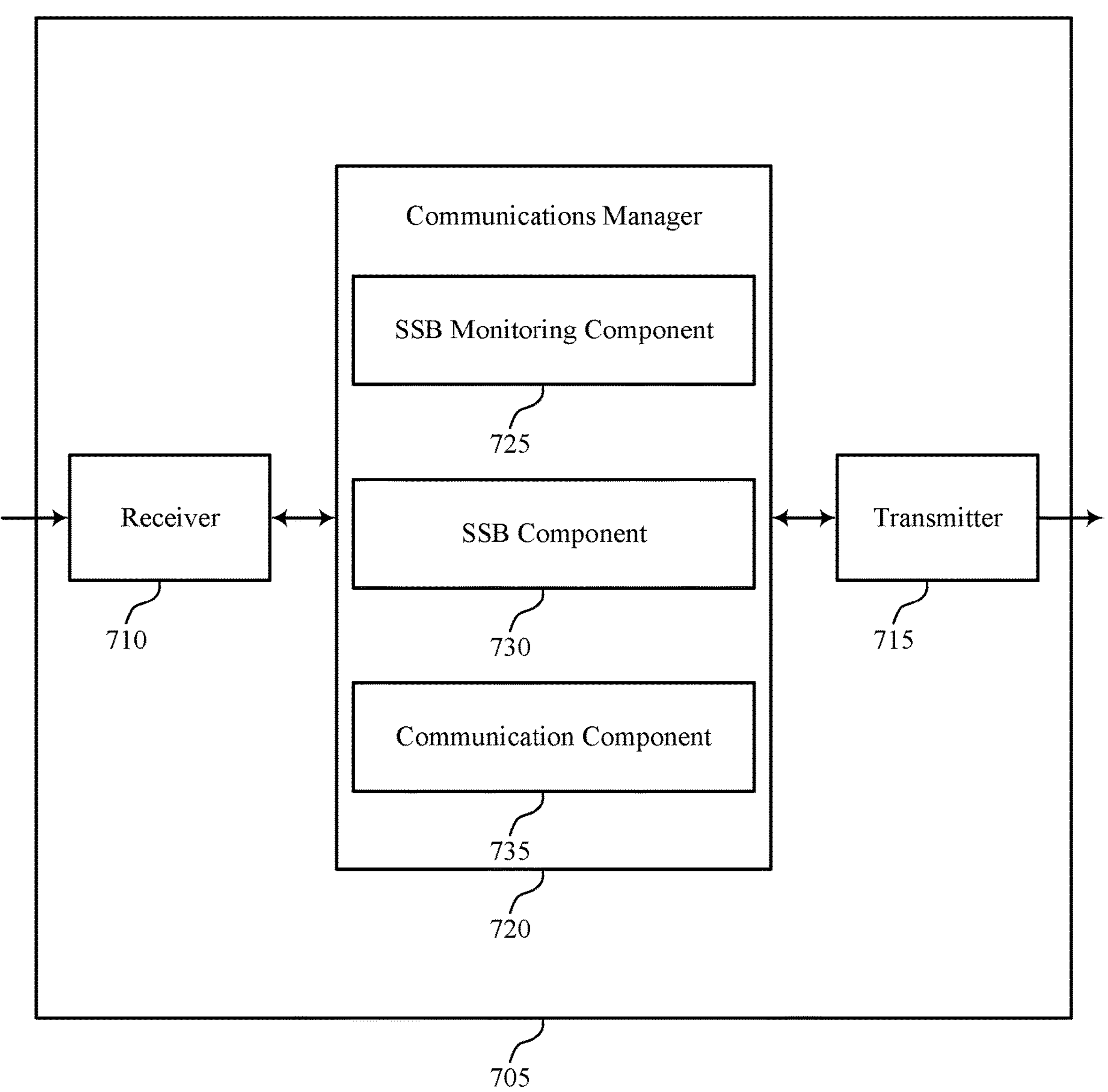

FIG. 7 shows a block diagram 700 of a device 705 that supports system information design in shared O-RAN RU systems in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to system information design in shared O-RAN RU systems). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to system information design in shared O-RAN RU systems). In some examples, the transmitter 715 may be co-located with a receiver 710 in a transceiver. The transmitter 715 may utilize a single antenna or a set of multiple antennas.

The device 705, or various components thereof, may be an example of means for performing various aspects of system information design in shared O-RAN RU systems as described herein. For example, the communications manager 720 may include an SSB monitoring component 725, an SSB component 730, a communication component 735, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a UE in accordance with examples as disclosed herein. The SSB monitoring component 725 is capable of, configured to, or operable to support a means for monitoring a RF spectrum for one or more physical SSBs from a network entity and associated with a MNO, where the RF spectrum and the network entity are shared by the MNO and one or more other MNOs. The SSB component 730 is capable of, configured to, or operable to support a means for receiving, based on the monitoring, the one or more physical SSBs via broadcast channel within the RF spectrum, the one or more physical SSBs including dedicated system information that is associated with the MNO and shared system information that is associated with the MNO and the one or more other MNOs. The communication component 735 is capable of, configured to, or operable to support a means for communicating via the RF spectrum in accordance with the dedicated system information and the shared system information.

Figure 8:
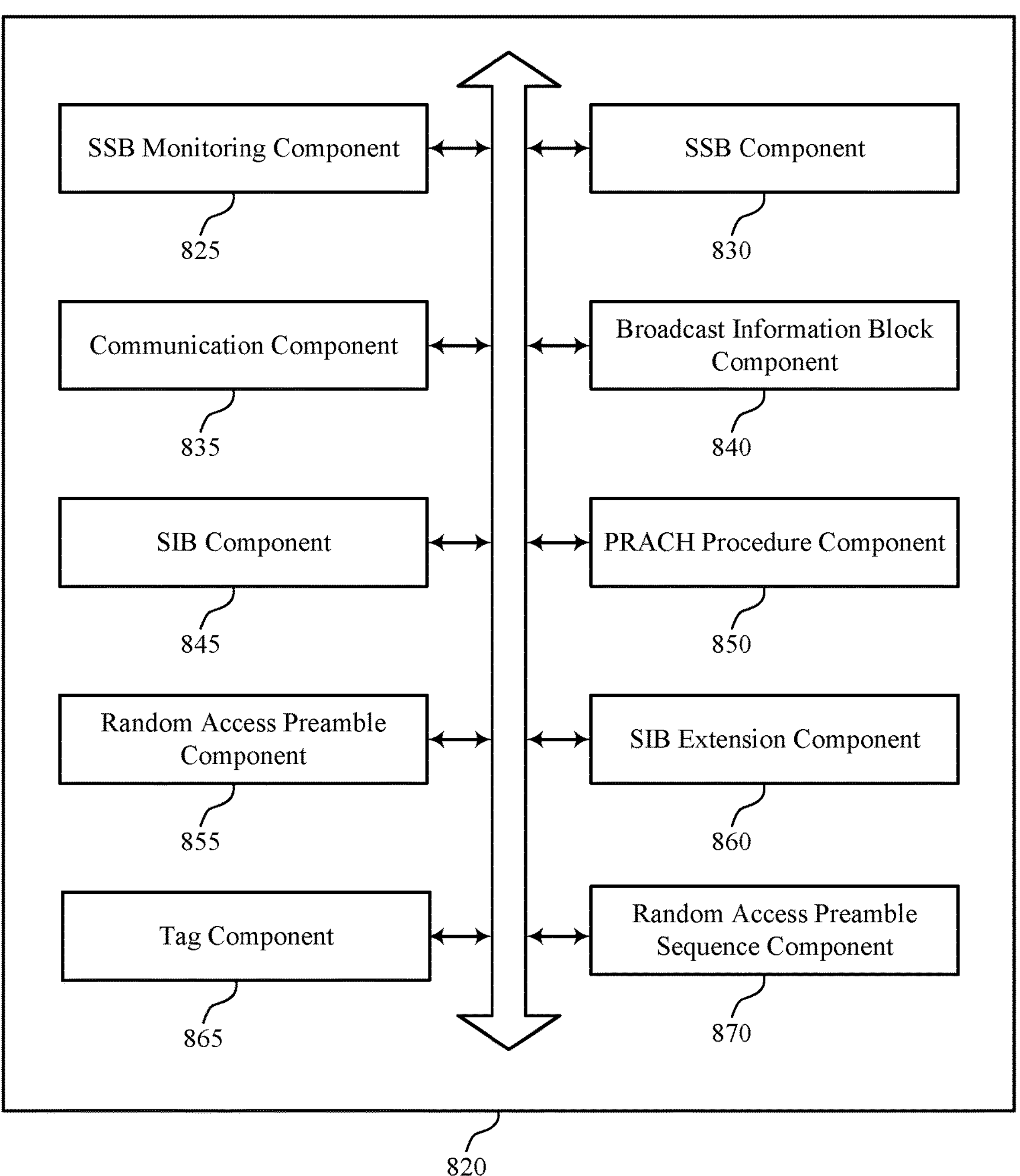
FIG. 8 shows a block diagram of a communications manager that supports system information design in shared O-RAN RU systems in accordance with one or more aspects of the present disclosure.

FIG. 8 shows a block diagram 800 of a communications manager 820 that supports system information design in shared O-RAN RU systems in accordance with one or more aspects of the present disclosure. The communications manager 820 may be an example of aspects of a communications manager 620, a communications manager 720, or both, as described herein. The communications manager 820, or various components thereof, may be an example of means for performing various aspects of system information design in shared O-RAN RU systems as described herein. For example, the communications manager 820 may include an SSB monitoring component 825, an SSB component 830, a communication component 835, a broadcast information block component 840, an SIB component 845, a PRACH procedure component 850, a random access preamble component 855, an SIB extension component 860, a tag component 865, a random access preamble sequence component 870, or any combination thereof. Each of these components may communicate, directly or indirectly, with one another (e.g., via one or more buses).

The communications manager 820 may support wireless communication at a UE in accordance with examples as disclosed herein. The SSB monitoring component 825 is capable of, configured to, or operable to support a means for monitoring a RF spectrum for one or more physical SSBs from a network entity and associated with a MNO, where the RF spectrum and the network entity are shared by the MNO and one or more other MNOs. The SSB component 830 is capable of, configured to, or operable to support a means for receiving, based on the monitoring, the one or more physical SSBs via broadcast channel within the RF spectrum, the one or more physical SSBs including dedicated system information that is associated with the MNO and shared system information that is associated with the MNO and the one or more other MNOs. The communication component 835 is capable of, configured to, or operable to support a means for communicating via the RF spectrum in accordance with the dedicated system information and the shared system information.

In some examples, to support receiving the one or more physical SSBs, the broadcast information block component 840 is capable of, configured to, or operable to support a means for receiving broadcast information block that is common to the MNO and the one or more other MNOs.

In some examples, the broadcast information block component 840 is capable of, configured to, or operable to support a means for receiving, via the broadcast information block, an indication of one or more downlink control channel resources allocated for a common SIB associated with the MNO and the one or more other MNOs.

In some examples, the broadcast information block component 840 is capable of, configured to, or operable to support a means for receiving, via the broadcast information block, at least a portion of the shared system information, where the shared system information includes an indication of an SFN, an SCS, a SSB subcarrier offset, one or more cell barring parameters, one or more cell reselection parameters, or any combination thereof for communications in accordance with the MNO and the one or more other MNOs.

In some examples, the SIB component 845 is capable of, configured to, or operable to support a means for receiving a broadcast SIB via one or more resources that are common to the MNO and the one or more other MNOs, the broadcast SIB including at least the shared system information.

In some examples, the SIB extension component 860 is capable of, configured to, or operable to support a means for receiving, via one or more second resources that are associated with the MNO, a SIB extension including one or more fields that indicate the dedicated system information associated with the MNO.

In some examples, the SIB component 845 is capable of, configured to, or operable to support a means for receiving, based on a size of the broadcast SIB exceeding a threshold size, a set of multiple messages including the broadcast SIB, where the broadcast SIB includes the shared system information and the dedicated system information associated with the MNO.

In some examples, the tag component 865 is capable of, configured to, or operable to support a means for receiving one or more messages including the dedicated system information associated with the MNO and a tag for determining subsequent system information for the MNO. In some examples, the tag component 865 is capable of, configured to, or operable to support a means for storing the tag for subsequent communications by the MNO.

In some examples, the PRACH procedure component 850 is capable of, configured to, or operable to support a means for receiving a broadcast SIB that includes an indication of a set of one or more resources for a PRACH procedure associated with the MNO and the one or more other MNOs. In some examples, the random access preamble component 855 is capable of, configured to, or operable to support a means for transmitting, via the set of one or more resources, a random access preamble associated with the MNO.

In some examples, the random access preamble sequence component 870 is capable of, configured to, or operable to support a means for transmitting, via the random access preamble, a sequence that indicates the MNO based on the set of one or more resources being common to the MNO and the one or more other MNOs.

In some examples, the broadcast SIB indicates a set of multiple subsets of resources within the set of one or more resources. In some examples, the set of multiple subsets of resources are separated in a time domain, in a frequency domain, or both. In some examples, each subset of the set of multiple subsets is associated with a respective MNO.

In some examples, the PRACH procedure component 850 is capable of, configured to, or operable to support a means for receiving a broadcast SIB that includes an indication of a set of one or more resources for a PRACH procedure associated with the MNO. In some examples, the random access preamble component 855 is capable of, configured to, or operable to support a means for transmitting a random access preamble via the set of one or more resources.

Figure 9:
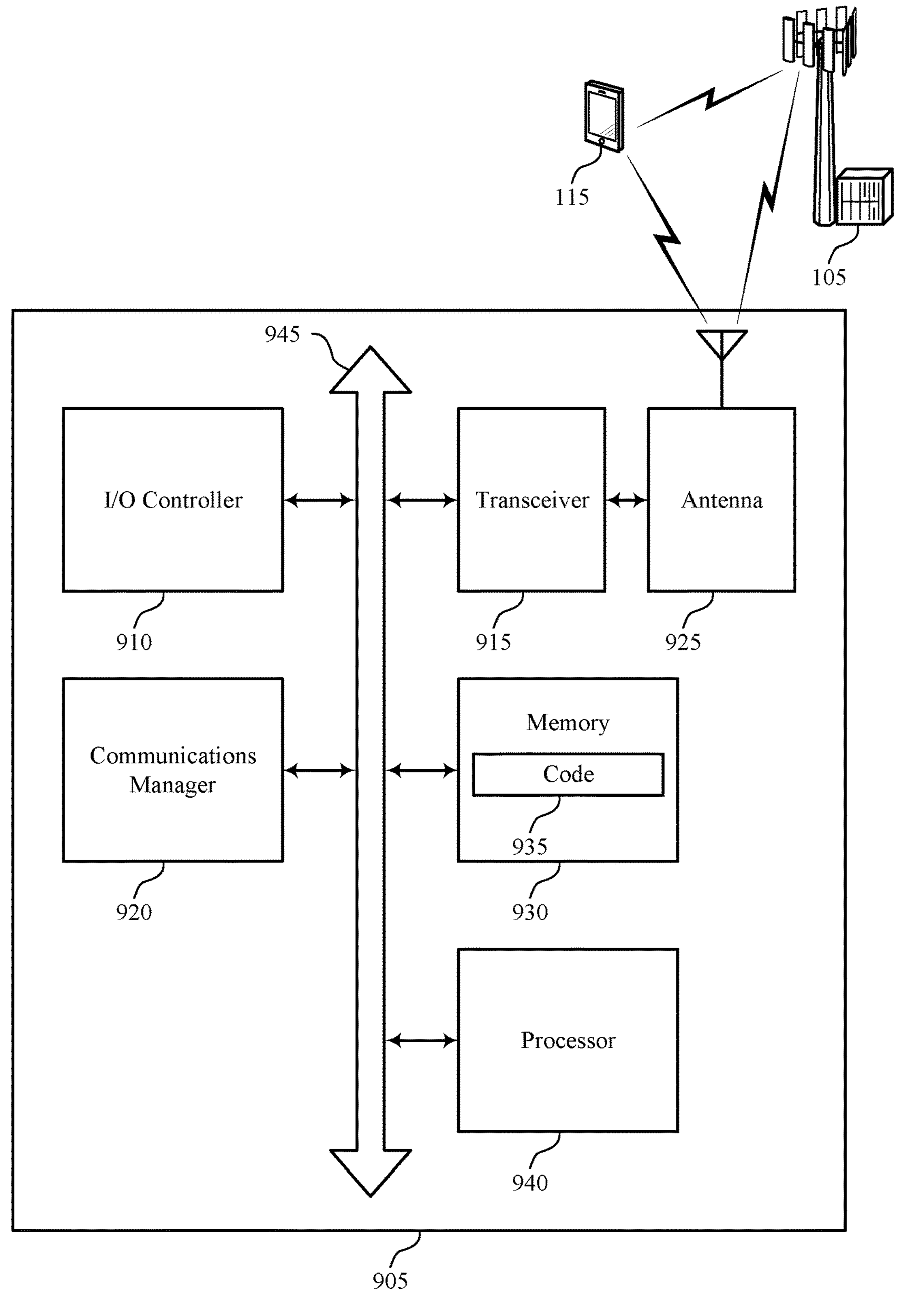
FIG. 9 shows a diagram of a system including a device that supports system information design in shared O-RAN RU systems in accordance with one or more aspects of the present disclosure.

FIG. 9 shows a diagram of a system 900 including a device 905 that supports system information design in shared O-RAN RU systems in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting system information design in shared O-RAN RU systems). For example, the device 905 or a component of the device 905 may include a processor 940 and memory 930 coupled with or to the processor 940, the processor 940 and memory 930 configured to perform various functions described herein.

The communications manager 920 may support wireless communication at a UE in accordance with examples as disclosed herein. For example, the communications manager 920 is capable of, configured to, or operable to support a means for monitoring a RF spectrum for one or more physical SSBs from a network entity and associated with a MNO, where the RF spectrum and the network entity are shared by the MNO and one or more other MNOs. The communications manager 920 is capable of, configured to, or operable to support a means for receiving, based on the monitoring, the one or more physical SSBs via broadcast channel within the RF spectrum, the one or more physical SSBs including dedicated system information that is associated with the MNO and shared system information that is associated with the MNO and the one or more other MNOs. The communications manager 920 is capable of, configured to, or operable to support a means for communicating via the RF spectrum in accordance with the dedicated system information and the sharing system information.

By including or configuring the communications manager 920 in accordance with examples as described herein, the device 905 may support techniques for more efficient utilization of communication resources and improved utilization of processing capability.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of system information design in shared O-RAN RU systems as described herein, or the processor 940 and the memory 930 may be otherwise configured to perform or support such operations.

Figure 10:
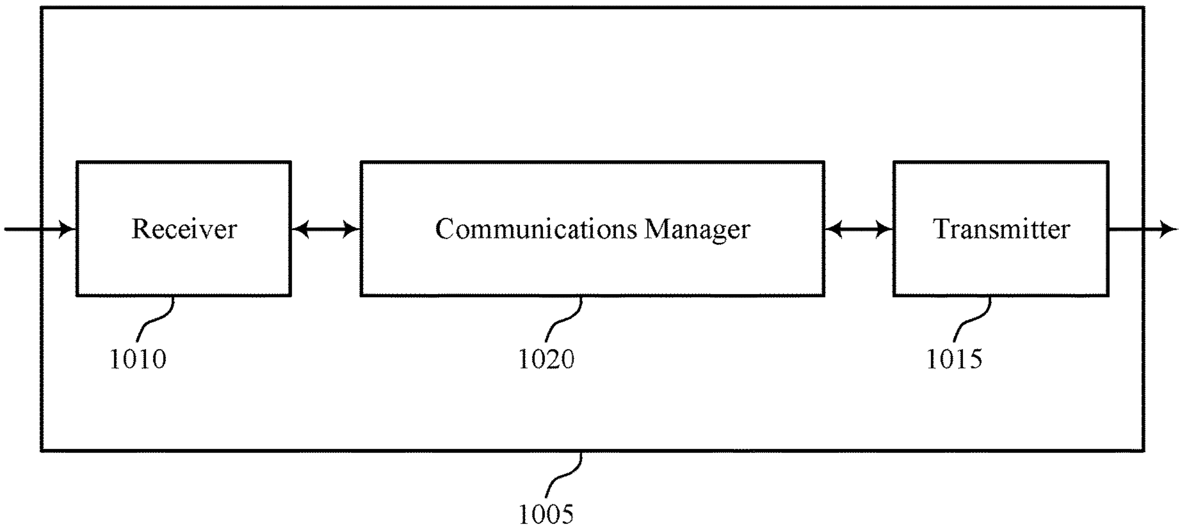
FIGS. 10 and 11 show block diagrams of devices that support system information design in shared O-RAN RU systems in accordance with one or more aspects of the present disclosure.

FIG. 10 shows a block diagram 1000 of a device 1005 that supports system information design in shared O-RAN RU systems in accordance with one or more aspects of the present disclosure. The device 1005 may be an example of aspects of a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of system information design in shared O-RAN RU systems as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a network node in accordance with examples as disclosed herein. For example, the communications manager 1020 is capable of, configured to, or operable to support a means for transmitting one or more physical SSBs via a broadcast channel within a RF spectrum, where both the network node and the RF spectrum are shared by a set of multiple MNOs, the one or more physical SSBs including dedicated system information that is associated with a MNO of the set of multiple MNOs and shared system information that is associated with the set of multiple MNOs. The communications manager 1020 is capable of, configured to, or operable to support a means for communicating via the RF spectrum in accordance with the dedicated system information and the sharing system information.

Additionally, or alternatively, the communications manager 1020 may support wireless communication at a first network node in accordance with examples as disclosed herein. For example, the communications manager 1020 is capable of, configured to, or operable to support a means for receiving, from a second network node, a broadcast message including a random access preamble. The communications manager 1020 is capable of, configured to, or operable to support a means for determining whether the random access preamble is intended for the first network node based on a first MNO associated with the random access preamble, where the first network node is associated with a second MNO. The communications manager 1020 is capable of, configured to, or operable to support a means for transmitting a RAR message based on the first MNO associated with the random access preamble being the same as the second MNO associated with the first network node.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for more efficient utilization of communication resources.

Figure 11:
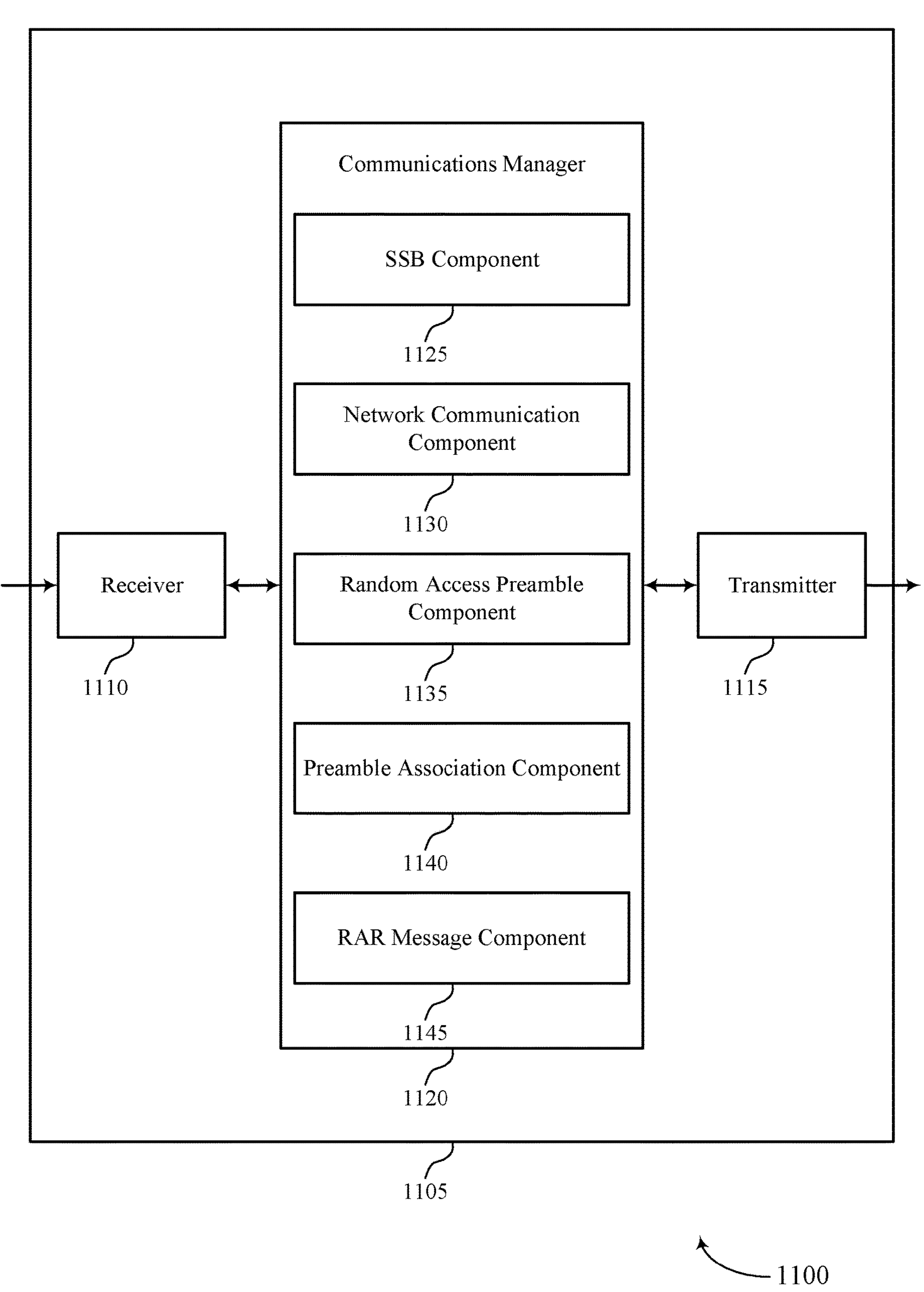

FIG. 11 shows a block diagram 1100 of a device 1105 that supports system information design in shared O-RAN RU systems in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of system information design in shared O-RAN RU systems as described herein. For example, the communications manager 1120 may include an SSB component 1125, a network communication component 1130, a random access preamble component 1135, a preamble association component 1140, a RAR message component 1145, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication at a network node in accordance with examples as disclosed herein. The SSB component 1125 is capable of, configured to, or operable to support a means for transmitting one or more physical SSBs via a broadcast channel within a RF spectrum, where both the network node and the RF spectrum are shared by a set of multiple MNOs, the one or more physical SSBs including dedicated system information that is associated with a MNO of the set of multiple MNOs and shared system information that is associated with the set of multiple MNOs. The network communication component 1130 is capable of, configured to, or operable to support a means for communicating via the RF spectrum in accordance with the dedicated system information and the shared system information.

Additionally, or alternatively, the communications manager 1120 may support wireless communication at a first network node in accordance with examples as disclosed herein. The random access preamble component 1135 is capable of, configured to, or operable to support a means for receiving, from a second network node, a broadcast message including a random access preamble. The preamble association component 1140 is capable of, configured to, or operable to support a means for determining whether the random access preamble is intended for the first network node based on a first MNO associated with the random access preamble, where the first network node is associated with a second MNO. The RAR message component 1145 is capable of, configured to, or operable to support a means for transmitting a RAR message based on the first MNO associated with the random access preamble being the same as the second MNO associated with the first network node.

Figure 12:
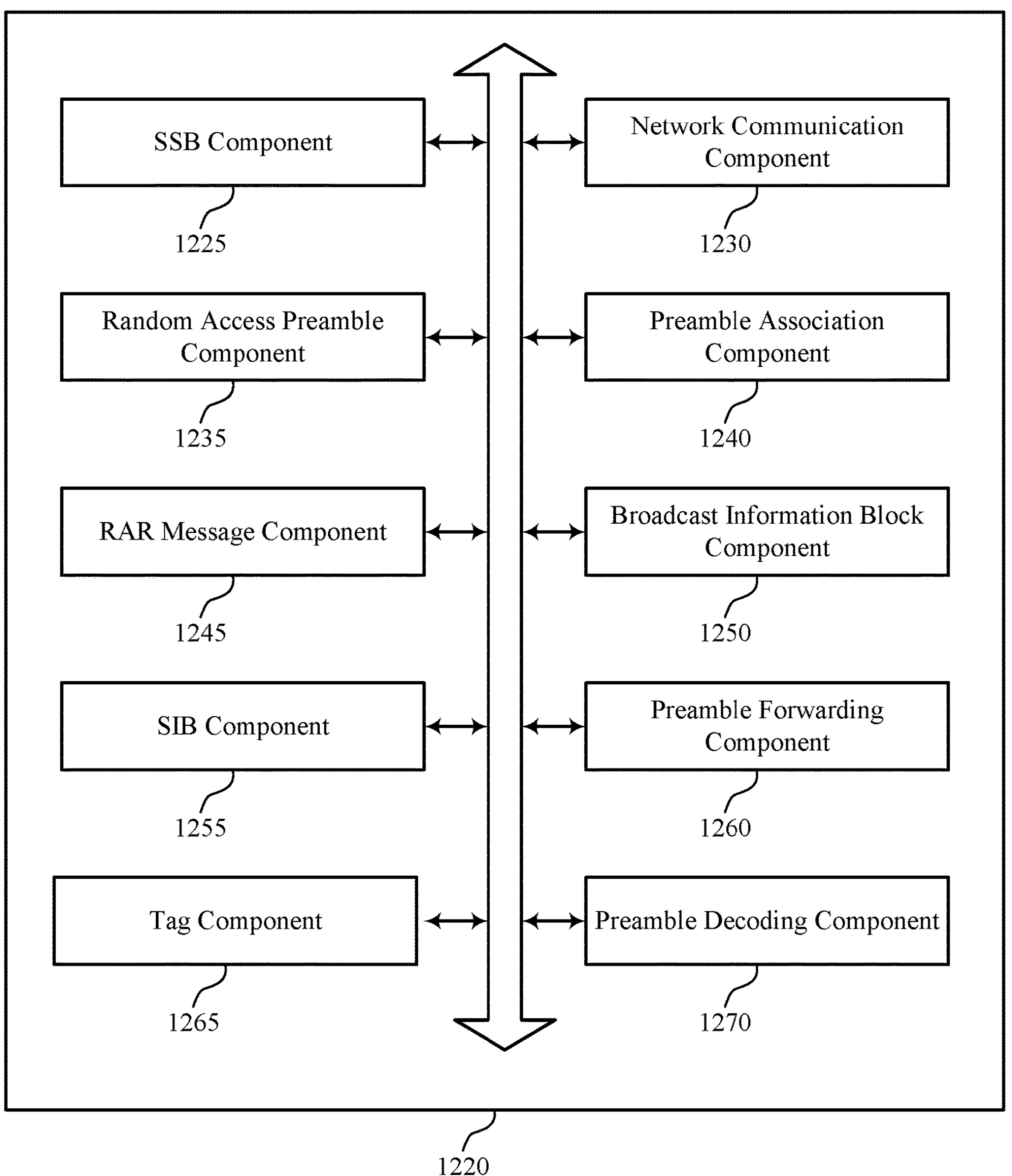
FIG. 12 shows a block diagram of a communications manager that supports system information design in shared O-RAN RU systems in accordance with one or more aspects of the present disclosure.

FIG. 12 shows a block diagram 1200 of a communications manager 1220 that supports system information design in shared O-RAN RU systems in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of system information design in shared O-RAN RU systems as described herein. For example, the communications manager 1220 may include an SSB component 1225, a network communication component 1230, a random access preamble component 1235, a preamble association component 1240, a RAR message component 1245, a broadcast information block component 1250, a SIB component 1255, a preamble forwarding component 1260, a tag component 1265, a preamble decoding component 1270, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communication at a network node in accordance with examples as disclosed herein. The SSB component 1225 is capable of, configured to, or operable to support a means for transmitting one or more physical SSBs via a broadcast channel within a RF spectrum, where both the network node and the RF spectrum are shared by a set of multiple MNOs, the one or more physical SSBs including dedicated system information that is associated with a MNO of the set of multiple MNOs and shared system information that is associated with the set of multiple MNOs. The network communication component 1230 is capable of, configured to, or operable to support a means for communicating via the RF spectrum in accordance with the dedicated system information and the shared system information.

In some examples, to support transmitting the one or more physical SSBs, the broadcast information block component 1250 is capable of, configured to, or operable to support a means for transmitting a broadcast information block that is common to the set of multiple MNOs.

In some examples, the broadcast information block component 1250 is capable of, configured to, or operable to support a means for transmitting, via the broadcast information block, an indication of one or more downlink control channel resources allocated for a common SIB associated with the set of multiple MNOs.

In some examples, the broadcast information block component 1250 is capable of, configured to, or operable to support a means for transmitting, via the broadcast information block, an indication of a system frame number, a subcarrier spacing, a SSB subcarrier offset, one or more cell barring parameters, one or more cell reselection parameters, or any combination thereof for communications in accordance with the set of multiple MNOs.

In some examples, the SIB component 1255 is capable of, configured to, or operable to support a means for transmitting a broadcast SIB via one or more resources that are common to the set of multiple MNOs, the broadcast SIB including at least the shared system information.

In some examples, the SIB component 1255 is capable of, configured to, or operable to support a means for transmitting, via one or more second resources that are associated with the MNO, a SIB extension including one or more fields that indicate the dedicated system information associated with the MNO.

In some examples, the SIB component 1255 is capable of, configured to, or operable to support a means for transmitting, based on a size of the broadcast SIB exceeding a threshold size, a set of multiple messages including the broadcast SIB, where the broadcast SIB includes the shared system information and the dedicated system information associated with the MNO.

In some examples, the tag component 1265 is capable of, configured to, or operable to support a means for transmitting one or more messages including the dedicated system information associated with the MNO and a tag for determining subsequent system information for the MNO.

In some examples, the SIB component 1255 is capable of, configured to, or operable to support a means for transmitting a broadcast SIB that includes an indication of a set of one or more resources for a PRACH procedure associated with the MNO. In some examples, the random access preamble component 1235 is capable of, configured to, or operable to support a means for receiving, from a UE that is associated with the MNO and via the set of one or more resources, a random access preamble associated with the MNO. In some examples, the preamble forwarding component 1260 is capable of, configured to, or operable to support a means for forwarding the random access preamble to a second network node that is associated with the MNO. In some examples, the RAR message component 1245 is capable of, configured to, or operable to support a means for receiving, based on the random access preamble, a RAR message from the second network node.

In some examples, the SIB component 1255 is capable of, configured to, or operable to support a means for transmitting a broadcast SIB that includes an indication of a set of one or more resources for a PRACH procedure associated with the set of multiple MNOs. In some examples, the random access preamble component 1235 is capable of, configured to, or operable to support a means for receiving, via the set of one or more resources, a random access preamble.

In some examples, the preamble forwarding component 1260 is capable of, configured to, or operable to support a means for forwarding the random access preamble to a set of multiple second network nodes based on receiving the random access preamble via the set of one or more resources that are common to the set of multiple MNOs, where the random access preamble includes a sequence that indicates the MNO based on the set of one or more resources being common to the set of multiple MNOs. In some examples, the RAR message component 1245 is capable of, configured to, or operable to support a means for receiving, from a second network node of the set of multiple second network nodes, a RAR message based on the second network node being associated with the MNO, where each second network node of the set of multiple second network nodes is associated with a respective MNO of the set of multiple MNOs.

In some examples, the random access preamble component 1235 is capable of, configured to, or operable to support a means for determining that the random access preamble is associated with the MNO based on a subset of resources via which the random access preamble is received, the set of one or more resources including a set of multiple subsets of resources that are separated in a time domain, in a frequency domain, or both, and where each subset of resources of the set of multiple subsets of resources is associated with a respective MNO. In some examples, the preamble forwarding component 1260 is capable of, configured to, or operable to support a means for forwarding the random access preamble to a second network node associated with the MNO based on the determining. In some examples, the RAR message component 1245 is capable of, configured to, or operable to support a means for receiving, from the second network node based on the random access preamble, a RAR message.

In some examples, the preamble forwarding component 1260 is capable of, configured to, or operable to support a means for forwarding the random access preamble to a set of multiple second network nodes based on receiving the random access preamble via the set of one or more resources that are common to the set of multiple MNOs, the set of one or more resources including a set of multiple subsets of resources that are separated in a time domain, in a frequency domain, or both, where the random access preamble is received via a subset of resources from among the set of one or more resources, and where each subset of resources of the set of multiple subsets of resources is associated with a respective MNO. In some examples, the RAR message component 1245 is capable of, configured to, or operable to support a means for receiving, from a second network node of the set of multiple second network nodes based on the random access preamble, a RAR message based on the subset of resources via which the random access preamble is received and the second network node being associated with the MNO.

Additionally, or alternatively, the communications manager 1220 may support wireless communication at a first network node in accordance with examples as disclosed herein. The random access preamble component 1235 is capable of, configured to, or operable to support a means for receiving, from a second network node, a broadcast message including a random access preamble. The preamble association component 1240 is capable of, configured to, or operable to support a means for determining whether the random access preamble is intended for the first network node based on a first MNO associated with the random access preamble, where the first network node is associated with a second MNO. The RAR message component 1245 is capable of, configured to, or operable to support a means for transmitting a RAR message based on the first MNO associated with the random access preamble being the same as the second MNO associated with the first network node.

In some examples, to support determining whether the random access preamble is intended for the first network node, the preamble decoding component 1270 is capable of, configured to, or operable to support a means for decoding a sequence appended to the random access preamble. In some examples, to support determining whether the random access preamble is intended for the first network node, the preamble association component 1240 is capable of, configured to, or operable to support a means for determining that the random access preamble is intended for the first network node based on the sequence being associated with the second MNO.

In some examples, to support determining whether the random access preamble is intended for the first network node, the preamble association component 1240 is capable of, configured to, or operable to support a means for determining that the random access preamble is intended for the first network node based on a subset of resources via which the random access preamble is received being associated with the second MNO.

In some examples, the preamble decoding component 1270 is capable of, configured to, or operable to support a means for receiving, from the second network node, a unicast message including a second random access preamble. In some examples, the RAR message component 1245 is capable of, configured to, or operable to support a means for transmitting a second RAR message based on receiving the random access preamble via the unicast message.

Figure 13:
FIG. 13 shows a diagram of a system including a device that supports system information design in shared O-RAN RU systems in accordance with one or more aspects of the present disclosure.

FIG. 13 shows a diagram of a system 1300 including a device 1305 that supports system information design in shared O-RAN RU systems in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementations, the transceiver 1310 may include or be configured for coupling with one or more processors or memory components that are operable to perform or support operations based on received or obtained information or signals, or to generate information or other signals for transmission or other outputting, or any combination thereof. In some implementations, the transceiver 1310, or the transceiver 1310 and the one or more antennas 1315, or the transceiver 1310 and the one or more antennas 1315 and one or more processors or memory components (for example, the processor 1335, or the memory 1325, or both), may be included in a chip or chip assembly that is installed in the device 1305. In some examples, the transceiver may be operable to support communications via one or more communications links (e.g., a communication link 125, a backhaul communication link 120, a midhaul communication link 162, a fronthaul communication link 168).

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting system information design in shared O-RAN RU systems). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the functions (e.g., by executing code 1330) to perform the functions of the device 1305. The processor 1335 may be any one or more suitable processors capable of executing scripts or instructions of one or more software programs stored in the device 1305 (such as within the memory 1325). In some implementations, the processor 1335 may be a component of a processing system. A processing system may generally refer to a system or series of machines or components that receives inputs and processes the inputs to produce a set of outputs (which may be passed to other systems or components of, for example, the device 1305). For example, a processing system of the device 1305 may refer to a system including the various other components or subcomponents of the device 1305, such as the processor 1335, or the transceiver 1310, or the communications manager 1320, or other components or combinations of components of the device 1305. The processing system of the device 1305 may interface with other components of the device 1305, and may process information received from other components (such as inputs or signals) or output information to other components. For example, a chip or modem of the device 1305 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1305 may transmit information output from the chip or modem. Additionally, or alternatively, in some implementations, the one or more interfaces may refer to an interface between the processing system of the chip or modem and a receiver, such that the device 1305 may obtain information or signal inputs, and the information may be passed to the processing system. A person having ordinary skill in the art will readily recognize that a first interface also may obtain information or signal inputs, and a second interface also may output information or signal outputs.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communication at a network node in accordance with examples as disclosed herein. For example, the communications manager 1320 is capable of, configured to, or operable to support a means for transmitting one or more physical SSBs via a broadcast channel within a RF spectrum, where both the network node and the RF spectrum are shared by a set of multiple MNOs, the one or more physical SSBs including dedicated system information that is associated with a MNO of the set of multiple MNOs and shared system information that is associated with the set of multiple MNOs. The communications manager 1320 is capable of, configured to, or operable to support a means for communicating via the RF spectrum in accordance with the dedicated system information and the sharing system information.

Additionally, or alternatively, the communications manager 1320 may support wireless communication at a first network node in accordance with examples as disclosed herein. For example, the communications manager 1320 is capable of, configured to, or operable to support a means for receiving, from a second network node, a broadcast message including a random access preamble. The communications manager 1320 is capable of, configured to, or operable to support a means for determining whether the random access preamble is intended for the first network node based on a first MNO associated with the random access preamble, where the first network node is associated with a second MNO. The communications manager 1320 is capable of, configured to, or operable to support a means for transmitting a RAR message based on the first MNO associated with the random access preamble being the same as the second MNO associated with the first network node.

By including or configuring the communications manager 1320 in accordance with examples as described herein, the device 1305 may support techniques for improved utilization of processing capability.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the transceiver 1310, the processor 1335, the memory 1325, the code 1330, or any combination thereof. For example, the code 1330 may include instructions executable by the processor 1335 to cause the device 1305 to perform various aspects of system information design in shared O-RAN RU systems as described herein, or the processor 1335 and the memory 1325 may be otherwise configured to perform or support such operations.

Figure 14:
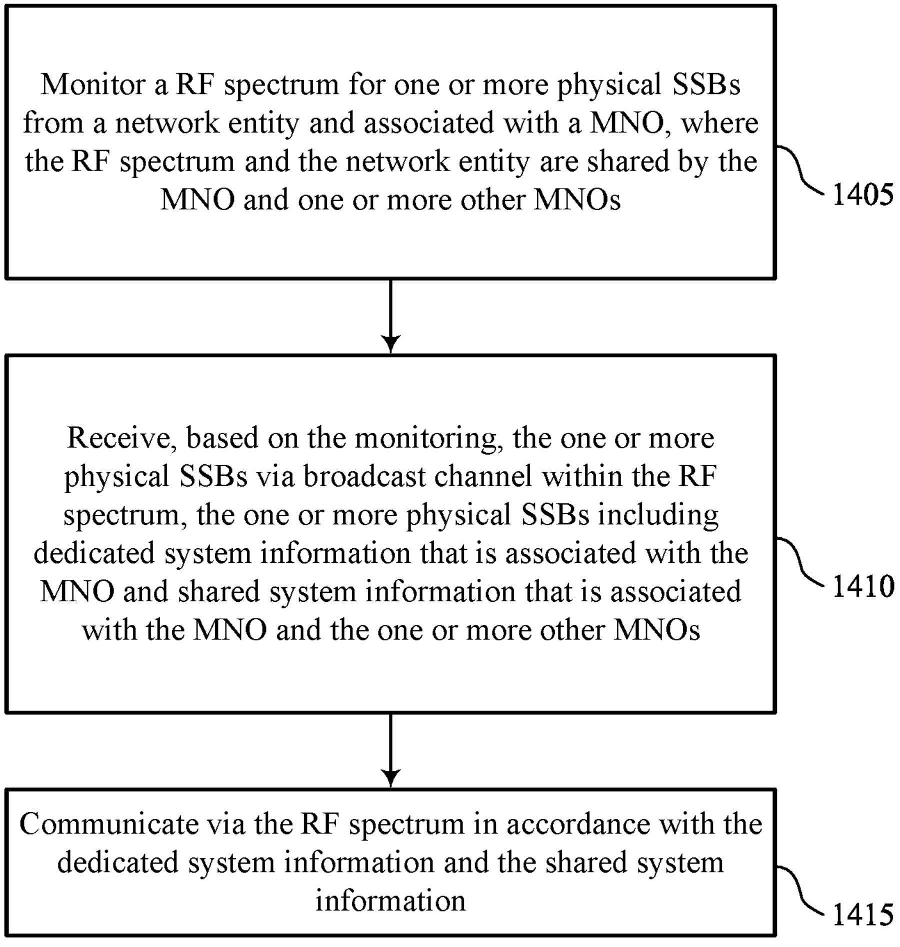

FIG. 14 shows a flowchart illustrating a method 1400 that supports system information design in shared O-RAN RU systems in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include monitoring a RF spectrum for one or more physical SSBs from a network entity and associated with a MNO, where the RF spectrum and the network entity are shared by the MNO and one or more other MNOs. The operations of block 1405 may be performed in accordance with examples as disclosed herein. In some examples, aspects of the operations of 1405 may be performed by an SSB monitoring component 825 as described with reference to FIG. 8.

At 1410, the method may include receiving, based on the monitoring, the one or more physical SSBs via broadcast channel within the RF spectrum, the one or more physical SSBs including dedicated system information that is associated with the MNO and shared system information that is associated with the MNO and the one or more other MNOs. The operations of block 1410 may be performed in accordance with examples as disclosed herein. In some examples, aspects of the operations of 1410 may be performed by an SSB component 830 as described with reference to FIG. 8.

At 1415, the method may include communicating via the RF spectrum in accordance with the dedicated system information and the shared system information. The operations of block 1415 may be performed in accordance with examples as disclosed herein. In some examples, aspects of the operations of 1415 may be performed by a communication component 835 as described with reference to FIG. 8.

Figure 15:
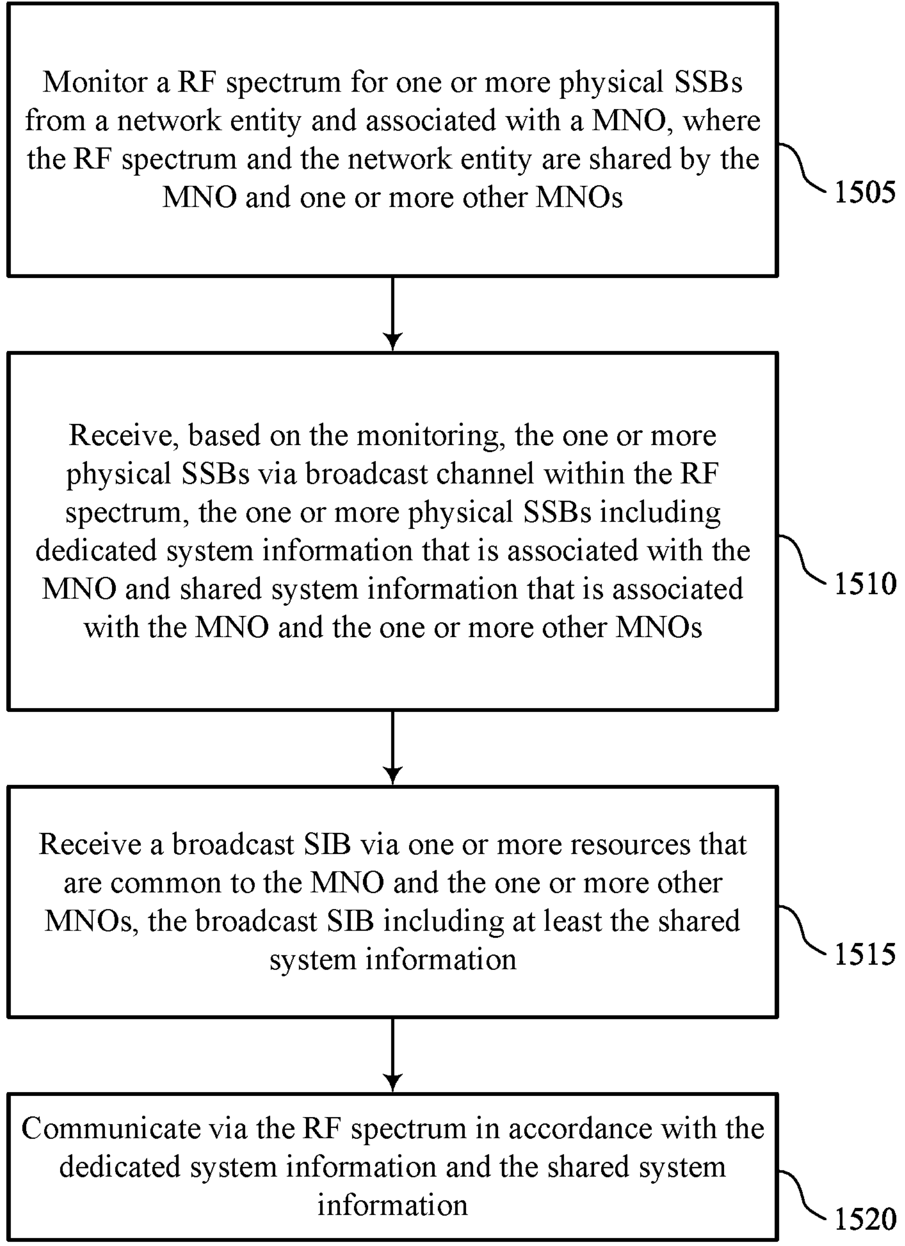

FIG. 15 shows a flowchart illustrating a method 1500 that supports system information design in shared O-RAN RU systems in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include monitoring a RF spectrum for one or more physical SSBs from a network entity and associated with a MNO, where the RF spectrum and the network entity are shared by the MNO and one or more other MNOs. The operations of block 1505 may be performed in accordance with examples as disclosed herein. In some examples, aspects of the operations of 1505 may be performed by an SSB monitoring component 825 as described with reference to FIG. 8.

At 1510, the method may include receiving, based on the monitoring, the one or more physical SSBs via broadcast channel within the RF spectrum, the one or more physical SSBs including dedicated system information that is associated with the MNO and shared system information that is associated with the MNO and the one or more other MNOs. The operations of block 1510 may be performed in accordance with examples as disclosed herein. In some examples, aspects of the operations of 1510 may be performed by an SSB component 830 as described with reference to FIG. 8.

At 1515, the method may include receiving a broadcast SIB via one or more resources that are common to the MNO and the one or more other MNOs, the broadcast SIB including at least the shared system information. The operations of block 1515 may be performed in accordance with examples as disclosed herein. In some examples, aspects of the operations of 1515 may be performed by an SIB component 845 as described with reference to FIG. 8.

At 1520, the method may include communicating via the RF spectrum in accordance with the dedicated system information and the shared system information. The operations of block 1520 may be performed in accordance with examples as disclosed herein. In some examples, aspects of the operations of 1520 may be performed by a communication component 835 as described with reference to FIG. 8.

FIG. 16 shows a flowchart illustrating a method 1600 that supports system information design in shared O-RAN RU systems in accordance with aspects of the present disclosure. The operations of the method 1600 may be implemented by a network entity or its components as described herein. For example, the operations of the method 1600 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1605, the method may include transmitting one or more physical SSBs via a broadcast channel within a RF spectrum, where both the network node and the RF spectrum are shared by a set of multiple MNOs, the one or more physical SSBs including dedicated system information that is associated with a MNO of the set of multiple MNOs and shared system information that is associated with the set of multiple MNOs. The operations of block 1605 may be performed in accordance with examples as disclosed herein. In some examples, aspects of the operations of 1605 may be performed by an SSB component 1225 as described with reference to FIG. 12.

At 1610, the method may include communicating via the RF spectrum in accordance with the dedicated system information and the shared system information. The operations of block 1610 may be performed in accordance with examples as disclosed herein. In some examples, aspects of the operations of 1610 may be performed by a network communication component 1230 as described with reference to FIG. 12.

Figure 17:
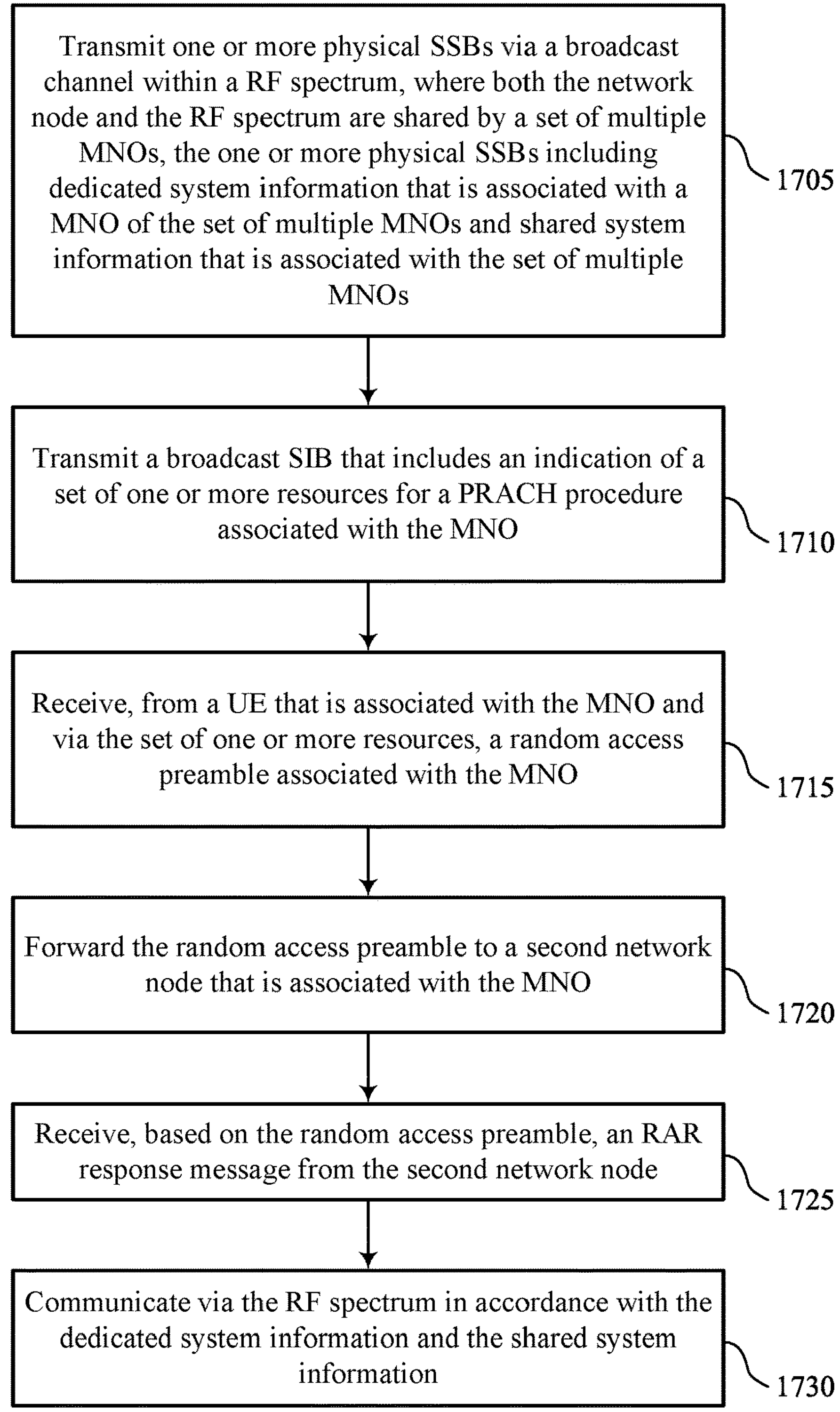

FIG. 17 shows a flowchart illustrating a method 1700 that supports system information design in shared O-RAN RU systems in accordance with aspects of the present disclosure. The operations of the method 1700 may be implemented by a network entity or its components as described herein. For example, the operations of the method 1700 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1705, the method may include transmitting one or more physical SSBs via a broadcast channel within a RF spectrum, where both the network node and the RF spectrum are shared by a set of multiple MNOs, the one or more physical SSBs including dedicated system information that is associated with a MNO of the set of multiple MNOs and shared system information that is associated with the set of multiple MNOs. The operations of block 1705 may be performed in accordance with examples as disclosed herein. In some examples, aspects of the operations of 1705 may be performed by an SSB component 1225 as described with reference to FIG. 12.

At 1710, the method may include transmitting a broadcast SIB that includes an indication of a set of one or more resources for a PRACH procedure associated with the MNO. The operations of block 1710 may be performed in accordance with examples as disclosed herein. In some examples, aspects of the operations of 1710 may be performed by a SIB component 1255 as described with reference to FIG. 12.

At 1715, the method may include receiving, from a UE that is associated with the MNO and via the set of one or more resources, a random access preamble associated with the MNO. The operations of block 1715 may be performed in accordance with examples as disclosed herein. In some examples, aspects of the operations of 1715 may be performed by a random access preamble component 1235 as described with reference to FIG. 12.

At 1720, the method may include forwarding the random access preamble to a second network node that is associated with the MNO. The operations of block 1720 may be performed in accordance with examples as disclosed herein. In some examples, aspects of the operations of 1720 may be performed by a preamble forwarding component 1260 as described with reference to FIG. 12.

At 1725, the method may include receiving, based on the random access preamble, an RAR message from the second network node. The operations of block 1725 may be performed in accordance with examples as disclosed herein. In some examples, aspects of the operations of 1725 may be performed by a RAR message component 1245 as described with reference to FIG. 12.

At 1730, the method may include communicating via the RF spectrum in accordance with the dedicated system information and the shared system information. The operations of block 1730 may be performed in accordance with examples as disclosed herein. In some examples, aspects of the operations of 1730 may be performed by a network communication component 1230 as described with reference to FIG. 12.

Figure 18:
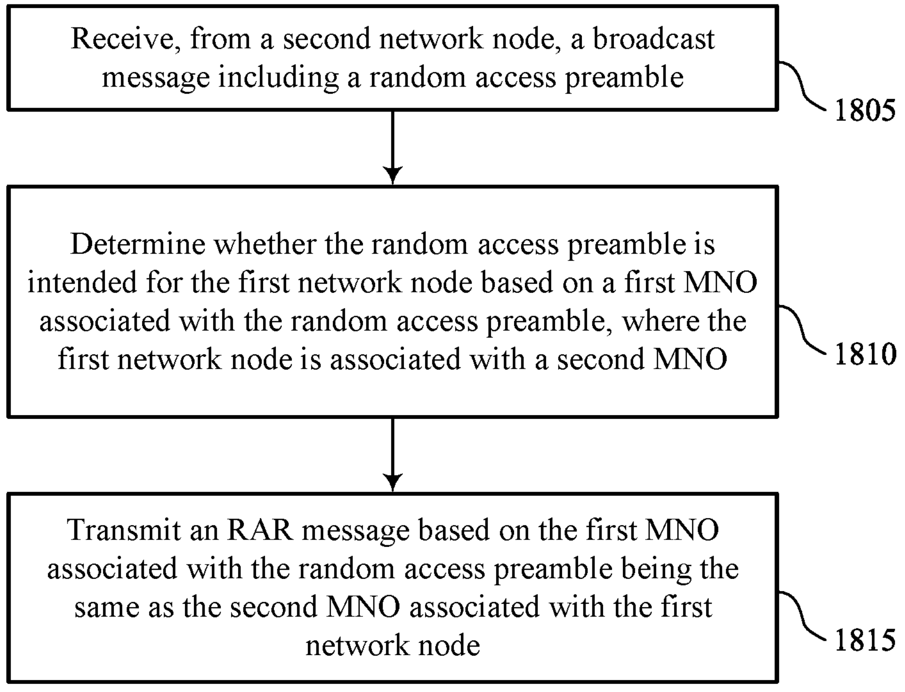

FIG. 18 shows a flowchart illustrating a method 1800 that supports system information design in shared O-RAN RU systems in accordance with aspects of the present disclosure. The operations of the method 1800 may be implemented by a network entity or its components as described herein. For example, the operations of the method 1800 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1805, the method may include receiving, from a second network node, a broadcast message including a random access preamble. The operations of block 1805 may be performed in accordance with examples as disclosed herein. In some examples, aspects of the operations of 1805 may be performed by a random access preamble component 1235 as described with reference to FIG. 12.

At 1810, the method may include determining whether the random access preamble is intended for the first network node based on a first MNO associated with the random access preamble, where the first network node is associated with a second MNO. The operations of block 1810 may be performed in accordance with examples as disclosed herein. In some examples, aspects of the operations of 1810 may be performed by a preamble association component 1240 as described with reference to FIG. 12.

At 1815, the method may include transmitting an RAR message based on the first MNO associated with the random access preamble being the same as the second MNO associated with the first network node. The operations of block 1815 may be performed in accordance with examples as disclosed herein. In some examples, aspects of the operations of 1815 may be performed by a RAR message component 1245 as described with reference to FIG. 12.

The following provides an overview of aspects of the present disclosure:

Aspect 1: A method for wireless communication at a UE, comprising: monitoring an RF spectrum for one or more physical SSBs from a network entity and associated with a MNO, wherein the RF spectrum and the network entity are shared by the MNO and one or more other MNOs; receiving, based at least in part on the monitoring, the one or more physical SSBs via broadcast channel within the RF spectrum, the one or more physical SSBs comprising dedicated system information that is associated with the MNO and shared system information that is associated with the MNO and the one or more other MNOs; and communicating via the RF spectrum in accordance with the dedicated system information and the shared system information.

Aspect 2: The method of aspect 1, wherein receiving the one or more physical SSBs comprises: receiving broadcast information block that is common to the MNO and the one or more other MNOs.

Aspect 3: The method of aspect 2, further comprising: receiving, via the broadcast information block, an indication of one or more downlink control channel resources allocated for a common SIB associated with the MNO and the one or more other MNOs.

Aspect 4: The method of any of aspects 2 through 3, further comprising: receiving, via the broadcast information block, at least a portion of the shared system information, wherein the shared system information comprises an indication of an SFN, an SCS, a SSB subcarrier offset, one or more cell barring parameters, one or more cell reselection parameters, or any combination thereof for communications in accordance with the MNO and the one or more other MNOs.

Aspect 5: The method of any of aspects 1 through 4, further comprising: receiving a broadcast SIB via one or more resources that are common to the MNO and the one or more other MNOs, the broadcast SIB comprising at least the shared system information.

Aspect 6: The method of aspect 5, further comprising: receiving, via one or more second resources that are associated with the MNO, a SIB extension comprising one or more fields that indicate the dedicated system information associated with the MNO.

Aspect 7: The method of any of aspects 5 through 6, further comprising: receiving, based at least in part on a size of the broadcast SIB exceeding a threshold size, a plurality of messages comprising the broadcast SIB, wherein the broadcast SIB comprises the shared system information and the dedicated system information associated with the MNO.

Aspect 8: The method of aspect 5, further comprising: receiving one or more messages comprising the dedicated system information associated with the MNO and a tag for determining subsequent system information for the MNO; and storing the tag for subsequent communications by the MNO.

Aspect 9: The method of any of aspects 1 through 8, further comprising: receiving a broadcast SIB that comprises an indication of a set of one or more resources for a PRACH procedure associated with the MNO and the one or more other MNOs; and transmitting, via the set of one or more resources, a random access preamble associated with the MNO.

Aspect 10: The method of aspect 9, further comprising: transmitting, via the random access preamble, a sequence that indicates the MNO based at least in part on the set of one or more resources being common to the MNO and the one or more other MNOs.

Aspect 11: The method of aspect 9, wherein the broadcast SIB indicates a plurality of subsets of resources within the set of one or more resources; the plurality of subsets of resources are separated in a time domain, in a frequency domain, or both; and each subset of the plurality of subsets is associated with a respective MNO.

Aspect 12: The method of any of aspects 1 through 11, further comprising: receiving a broadcast SIB that comprises an indication of a set of one or more resources for a PRACH procedure associated with the MNO; and transmitting a random access preamble via the set of one or more resources.

Aspect 13: A method for wireless communication at a network node, comprising: transmitting one or more physical SSBs via a broadcast channel within an RF spectrum, wherein both the network node and the RF spectrum are shared by a plurality of MNOs, the one or more physical SSBs comprising dedicated system information that is associated with a MNO of the plurality of MNOs and shared system information that is associated with the plurality of MNOs; and communicating via the RF spectrum in accordance with the dedicated system information and the shared system information.

Aspect 14: The method of aspect 13, wherein transmitting the one or more physical SSBs comprises: transmitting a broadcast information block that is common to the plurality of MNOs.

Aspect 15: The method of aspect 14, further comprising: transmitting, via the broadcast information block, an indication of one or more downlink control channel resources allocated for a common SIB associated with the plurality of MNOs.

Aspect 16: The method of any of aspects 14 through 15, further comprising: transmitting, via the broadcast information block, an indication of an SFN, an SCS, a SSB subcarrier offset, one or more cell barring parameters, one or more cell reselection parameters, or any combination thereof for communications in accordance with the plurality of MNOs.

Aspect 17: The method of any of aspects 13 through 16, further comprising: transmitting a broadcast SIB via one or more resources that are common to the plurality of MNOs, the broadcast SIB comprising at least the shared system information.

Aspect 18: The method of aspect 17, further comprising: transmitting, via one or more second resources that are associated with the MNO, a SIB extension comprising one or more fields that indicate the dedicated system information associated with the MNO.

Aspect 19: The method of any of aspects 17 through 18, further comprising: transmitting, based at least in part on a size of the broadcast SIB exceeding a threshold size, a plurality of messages comprising the broadcast SIB, wherein the broadcast SIB comprises the shared system information and the dedicated system information associated with the MNO.

Aspect 20: The method of aspect 17, further comprising: transmitting one or more messages comprising the dedicated system information associated with the MNO and a tag for determining subsequent system information for the MNO.

Aspect 21: The method of any of aspects 13 through 20, further comprising: transmitting a broadcast SIB that comprises an indication of a set of one or more resources for a PRACH procedure associated with the MNO; receiving, from a UE that is associated with the MNO and via the set of one or more resources, a random access preamble associated with the MNO; forwarding the random access preamble to a second network node that is associated with the MNO; and receiving, based at least in part on the random access preamble, a RAR message from the second network node.

Aspect 22: The method of any of aspects 13 through 20, further comprising: transmitting a broadcast SIB that comprises an indication of a set of one or more resources for a PRACH procedure associated with the plurality of MNOs; and receiving, via the set of one or more resources, a random access preamble.

Aspect 23: The method of aspect 22, further comprising: forwarding the random access preamble to a plurality of second network nodes based at least in part on receiving the random access preamble via the set of one or more resources that are common to the plurality of MNOs, wherein the random access preamble comprises a sequence that indicates the MNO based at least in part on the set of one or more resources being common to the plurality of MNOs; and receiving, from a second network node of the plurality of second network nodes, a RAR message based at least in part on the second network node being associated with the MNO, wherein each second network node of the plurality of second network nodes is associated with a respective MNO of the plurality of MNOs.

Aspect 24: The method of aspect 22, further comprising: determining that the random access preamble is associated with the MNO based at least in part on a subset of resources via which the random access preamble is received, the set of one or more resources comprising a plurality of subsets of resources that are separated in a time domain, in a frequency domain, or both, and wherein each subset of resources of the plurality of subsets of resources is associated with a respective MNO; forwarding the random access preamble to a second network node associated with the MNO based at least in part on the determining; and receiving, from the second network node based at least in part on the random access preamble, a RAR message.

Aspect 25: The method of aspect 22, further comprising: forwarding the random access preamble to a plurality of second network nodes based at least in part on receiving the random access preamble via the set of one or more resources that are common to the plurality of MNOs, the set of one or more resources comprising a plurality of subsets of resources that are separated in a time domain, in a frequency domain, or both, wherein the random access preamble is received via a subset of resources from among the set of one or more resources, and wherein each subset of resources of the plurality of subsets of resources is associated with a respective MNO; and receiving, from a second network node of the plurality of second network nodes based at least in part on the random access preamble, a RAR message based at least in part on the subset of resources via which the random access preamble is received and the second network node being associated with the MNO.

Aspect 26: A method for wireless communication at a first network node, comprising: receiving, from a second network node, a broadcast message comprising a random access preamble; determining whether the random access preamble is intended for the first network node based at least in part on a first MNO associated with the random access preamble, wherein the first network node is associated with a second MNO; and transmitting a RAR message based at least in part on the first MNO associated with the random access preamble being the same as the second MNO associated with the first network node.

Aspect 27: The method of aspect 26, wherein determining whether the random access preamble is intended for the first network node comprises: decoding a sequence appended to the random access preamble; and determining that the random access preamble is intended for the first network node based at least in part on the sequence being associated with the second MNO.

Aspect 28: The method of aspect 26, wherein determining whether the random access preamble is intended for the first network node comprises: determining that the random access preamble is intended for the first network node based at least in part on a subset of resources via which the random access preamble is received being associated with the second MNO.

Aspect 29: The method of any of aspects 26 through 28, further comprising: receiving, from the second network node, a unicast message comprising a second random access preamble; and transmitting a second RAR message based at least in part on receiving the random access preamble via the unicast message.

Aspect 30: An apparatus for wireless communication at a UE, comprising a processor; memory coupled with the processor; and instructions stored in the memory and executable by the processor to cause the apparatus to perform a method of any of aspects 1 through 12.

Aspect 31: An apparatus for wireless communication at a UE, comprising at least one means for performing a method of any of aspects 1 through 12.

Aspect 32: A non-transitory computer-readable medium storing code for wireless communication at a UE, the code comprising instructions executable by a processor to perform a method of any of aspects 1 through 12.

Aspect 33: An apparatus for wireless communication at a network node, comprising a processor; memory coupled with the processor; and instructions stored in the memory and executable by the processor to cause the apparatus to perform a method of any of aspects 13 through 25.

Aspect 34: An apparatus for wireless communication at a network node, comprising at least one means for performing a method of any of aspects 13 through 25.

Aspect 35: A non-transitory computer-readable medium storing code for wireless communication at a network node, the code comprising instructions executable by a processor to perform a method of any of aspects 13 through 25.

Aspect 36: An apparatus for wireless communication at a first network node, comprising a processor; memory coupled with the processor; and instructions stored in the memory and executable by the processor to cause the apparatus to perform a method of any of aspects 26 through 29.

Aspect 37: An apparatus for wireless communication at a first network node, comprising at least one means for performing a method of any of aspects 26 through 29.

Aspect 38: A non-transitory computer-readable medium storing code for wireless communication at a first network node, the code comprising instructions executable by a processor to perform a method of any of aspects 26 through 29.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A. LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE) for wireless communication, comprising:

one or more processors;

one or more memories coupled with the one or more processors; and instructions stored in the one or more memories and executable by the one or more processors to cause the UE to:

monitor a radio frequency spectrum for one or more physical synchronization signal blocks from a network entity and associated with a mobile network operator, wherein the radio frequency spectrum and the network entity are shared by the mobile network operator and one or more other mobile network operators;

receive, based at least in part on the monitoring, the one or more physical synchronization signal blocks via broadcast channel within the radio frequency spectrum, the one or more physical synchronization signal blocks comprising dedicated system information that is associated with the mobile network operator and shared system information that is associated with the mobile network operator and the one or more other mobile network operators;

receive, based at least in part on a size of a broadcast system information block exceeding a threshold size, a plurality of messages comprising the broadcast system information block, wherein the plurality of messages is received via one or more resources that are common to the mobile network operator and the one or more other mobile network operators, and wherein the broadcast system information block comprises the shared system information and the dedicated system information associated with the mobile network operator; and communicate via the radio frequency spectrum in accordance with the dedicated system information and the shared system information.

2. The UE of claim 1, wherein the instructions to receive the one or more physical synchronization signal blocks are executable by the one or more processors to cause the UE to:

receive a broadcast information block that is common to the mobile network operator and the one or more other mobile network operators.

3. The UE of claim 2, wherein the instructions are further executable by the one or more processors to cause the UE to:

receive, via the broadcast information block, an indication of the one or more resources allocated for the broadcast system information block associated with the mobile network operator and the one or more other mobile network operators.

4. The UE of claim 2, wherein the instructions are further executable by the one or more processors to cause the UE to:

receive, via the broadcast information block, at least a portion of the shared system information, wherein the shared system information comprises an indication of a system frame number, a subcarrier spacing, a synchronization signal block subcarrier offset, one or more cell barring parameters, one or more cell reselection parameters, or any combination thereof for communications in accordance with the mobile network operator and the one or more other mobile network operators.

5. The UE of claim 1, wherein the instructions are further executable by the one or more processors to cause the UE to:

receive, via one or more second resources that are associated with the mobile network operator, a system information block extension comprising one or more fields that indicate the dedicated system information associated with the mobile network operator.

6. The UE of claim 1, wherein the plurality of messages comprises a tag for determining subsequent system information for the mobile network operator, and wherein the instructions are further executable by the one or more processors to cause the UE to:

store the tag for subsequent communications by the mobile network operator.

7. The UE of claim 1, wherein the broadcast system information block comprises an indication of a set of one or more resources for a physical random access channel procedure associated with the mobile network operator and the one or more other mobile network operators, and wherein the instructions are further executable by the one or more processors to cause the UE to:

transmit, via the set of one or more resources, a random access preamble associated with the mobile network operator.

8. The UE of claim 7, wherein the instructions are further executable by the one or more processors to cause the UE to:

transmit, via the random access preamble, a sequence that indicates the mobile network operator based at least in part on the set of one or more resources being common to the mobile network operator and the one or more other mobile network operators.

9. The UE of claim 7, wherein:

the broadcast system information block indicates a plurality of subsets of resources within the set of one or more resources;

the plurality of subsets of resources are separated in a time domain, in a frequency domain, or both; and each subset of the plurality of subsets is associated with a respective mobile network operator.

10. The UE of claim 1, wherein the broadcast system information block comprises an indication of a set of one or more resources for a physical random access channel procedure associated with the mobile network operator, and wherein the instructions are further executable by the one or more processors to cause the UE to:

transmit a random access preamble via the set of one or more resources.

11. A network node for wireless communication, comprising:

one or more processors;

one or more memories coupled with the one or more processors; and instructions stored in the one or more memories and executable by the one or more processors to cause the network node to:

transmit one or more physical synchronization signal blocks via a broadcast channel within a radio frequency spectrum, wherein both the network node and the radio frequency spectrum are shared by a plurality of mobile network operators, the one or more physical synchronization signal blocks comprising dedicated system information that is associated with the mobile network operator and shared system information that is associated with the plurality of mobile network operators;

transmit, based at least in part on a size of a broadcast system information block exceeding a threshold size, a plurality of messages comprising the broadcast system information block, wherein the plurality of messages is transmitted via one or more resources that are common to the plurality of mobile network operators, and wherein the broadcast system information block comprises the shared system information and the dedicated system information associated with the mobile network operator; and communicate via the radio frequency spectrum in accordance with the dedicated system information and the shared system information.

12. The network node of claim 11, wherein the instructions to transmit the one or more physical synchronization signal blocks are executable by the one or more processors to cause the network node to:

transmit a broadcast information block that is common to the plurality of mobile network operators.

13. The network node of claim 12, wherein the instructions are further executable by the one or more processors to cause the network node to:

transmit, via the broadcast information block, an indication of the one or more resources allocated for the broadcast system information block associated with the plurality of mobile network operators.

14. The network node of claim 12, wherein the instructions are further executable by the one or more processors to cause the network node to:

transmit, via the broadcast information block, an indication of a system frame number, a subcarrier spacing, a synchronization signal block subcarrier offset, one or more cell barring parameters, one or more cell reselection parameters, or any combination thereof for communications in accordance with the plurality of mobile network operators.

15. The network node of claim 11, wherein the instructions are further executable by the one or more processors to cause the network node to:

transmit, via one or more second resources that are associated with the mobile network operator, a system information block extension comprising one or more fields that indicate the dedicated system information associated with the mobile network operator.

16. The network node of claim 11, wherein the plurality of messages further comprises a tag for determining subsequent system information for the mobile network operator.

17. The network node of claim 11, wherein the broadcast system information block comprises an indication of a set of one or more resources for a physical random access channel procedure associated with the mobile network operator, and wherein the instructions are further executable by the one or more processors to cause the network node to:

receive, from a user equipment (UE) that is associated with the mobile network operator and via the set of one or more resources, a random access preamble associated with the mobile network operator;

forward the random access preamble to a second network node that is associated with the mobile network operator; and receive, based at least in part on the random access preamble, a random access response message from the second network node.

18. The network node of claim 11, wherein the broadcast system information block comprises an indication of a set of one or more resources for a physical random access channel procedure associated with the plurality of mobile network operators, and wherein the instructions are further executable by the one or more processors to cause the network node to:

receive, via the set of one or more resources, a random access preamble.

19. The network node of claim 18, wherein the instructions are further executable by the one or more processors to cause the network node to:

forward the random access preamble to a plurality of second network nodes based at least in part on receiving the random access preamble via the set of one or more resources that are common to the plurality of mobile network operators, wherein the random access preamble comprises a sequence that indicates the mobile network operator based at least in part on the set of one or more resources being common to the plurality of mobile network operators; and receive, from a second network node of the plurality of second network nodes, a random access response message based at least in part on the second network node being associated with the mobile network operator, wherein each second network node of the plurality of second network nodes is associated with a respective mobile network operator of the plurality of mobile network operators.

20. The network node of claim 18, wherein the instructions are further executable by the one or more processors to cause the network node to:

forward the random access preamble to a second network node associated with the mobile network operator based at least in part on a subset of resources via which the random access preamble is received indicating that the random access preamble is associated with the mobile network operator, the set of one or more resources comprising a plurality of subsets of resources that are separated in a time domain, in a frequency domain, or both, and wherein each subset of resources of the plurality of subsets of resources is associated with a respective mobile network operator; and receive, from the second network node based at least in part on the random access preamble, a random access response message.

21. The network node of claim 18, wherein the instructions are further executable by the one or more processors to cause the network node to:

forward the random access preamble to a plurality of second network nodes based at least in part on receiving the random access preamble via the set of one or more resources that are common to the plurality of mobile network operators, the set of one or more resources comprising a plurality of subsets of resources that are separated in a time domain, in a frequency domain, or both, wherein the random access preamble is received via a subset of resources from among the set of one or more resources, and wherein each subset of resources of the plurality of subsets of resources is associated with a respective mobile network operator; and receive, from a second network node of the plurality of second network nodes based at least in part on the random access preamble, a random access response message based at least in part on the subset of resources via which the random access preamble is received and the second network node being associated with the mobile network operator.

22. A method for wireless communication at a user equipment (UE), comprising:

monitoring a radio frequency spectrum for one or more physical synchronization signal blocks from a network entity and associated with a mobile network operator, wherein the radio frequency spectrum and the network entity are shared by the mobile network operator and one or more other mobile network operators;

receiving, based at least in part on the monitoring, the one or more physical synchronization signal blocks via broadcast channel within the radio frequency spectrum, the one or more physical synchronization signal blocks comprising dedicated system information that is associated with the mobile network operator and shared system information that is associated with the mobile network operator and the one or more other mobile network operators;

receiving, based at least in part on a size of a broadcast system information block exceeding a threshold size, a plurality of messages comprising the broadcast system information block, wherein the plurality of messages is received via one or more resources that are common to the mobile network operator and the one or more other mobile network operators, and wherein the broadcast system information block comprises the shared system information and the dedicated system information associated with the mobile network operator; and communicating via the radio frequency spectrum in accordance with the dedicated system information and the shared system information.

23. The method of claim 22, wherein receiving the one or more physical synchronization signal blocks comprises:

receiving broadcast information block that is common to the mobile network operator and the one or more other mobile network operators.

24. A method for wireless communication at a network node, comprising:

transmitting one or more physical synchronization signal blocks via a broadcast channel within a radio frequency spectrum, wherein both the network node and the radio frequency spectrum are shared by a plurality of mobile network operators, the one or more physical synchronization signal blocks comprising dedicated system information that is associated with the mobile network operator and shared system information that is associated with the plurality of mobile network operators;

transmit, based at least in part on a size of a broadcast system information block exceeding a threshold size, a plurality of messages comprising the broadcast system information block, wherein the plurality of messages is transmitted via one or more resources that are common to the plurality of mobile network operators, and wherein the broadcast system information block comprises the shared system information and the dedicated system information associated with the mobile network operator; and communicating via the radio frequency spectrum in accordance with the dedicated system information and the shared system information.

25. The method of claim 24, wherein transmitting the one or more physical synchronization signal blocks comprises:

transmitting a broadcast information block that is common to the plurality of mobile network operators.

* * * * *